United States Patent
Honjo et al.

(10) Patent No.: US 8,514,314 B2
(45) Date of Patent: Aug. 20, 2013

(54) CAMERA SYSTEM

(75) Inventors: Kenichi Honjo, Osaka (JP); Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 12/977,314

(22) Filed: Dec. 23, 2010

(65) Prior Publication Data
US 2011/0090391 A1    Apr. 21, 2011

Related U.S. Application Data

(63) Continuation of application No. 12/128,677, filed on May 29, 2008, now Pat. No. 7,948,549.

(30) Foreign Application Priority Data

Jun. 1, 2007   (JP) ................................. 2007-146502

(51) Int. Cl.
*H04N 5/225*   (2006.01)
(52) U.S. Cl.
USPC .................................................... 348/333.05
(58) Field of Classification Search
USPC ...................... 348/239, 333.05, 346; 396/374
See application file for complete search history.

(56) References Cited

U.S. PATENT DOCUMENTS

| | | | |
|---|---|---|---|
| 5,172,234 A | 12/1992 | Arita et al. | |
| 5,557,358 A | 9/1996 | Mukai et al. | |
| 7,136,096 B1 * | 11/2006 | Yamagishi et al. | ........ 348/218.1 |
| 7,697,054 B2 * | 4/2010 | Cazier et al. | ............. 348/333.05 |
| 8,264,588 B2 * | 9/2012 | Fujio et al. | ................ 348/333.12 |
| 2005/0097475 A1 * | 5/2005 | Makioka et al. | ............... 715/792 |
| 2007/0291154 A1 * | 12/2007 | Moon et al. | ............... 348/333.05 |
| 2008/0025712 A1 * | 1/2008 | Furuya | ............................ 396/88 |
| 2008/0055453 A1 * | 3/2008 | Battles et al. | ............. 348/333.05 |
| 2008/0055454 A1 | 3/2008 | Yumiki | |
| 2008/0273110 A1 | 11/2008 | Joza et al. | |

(Continued)

FOREIGN PATENT DOCUMENTS

| | | |
|---|---|---|
| JP | 6006807 | 1/1994 |
| JP | 2000-047291 A | 2/2000 |

(Continued)

OTHER PUBLICATIONS

Japanese Office action for JP2007-146502 dated Jul. 3, 2012.
Japanese Office Action for Application No. JP 2007-146502 dated Feb. 5, 2013.

*Primary Examiner* — Aung S Moe
(74) *Attorney, Agent, or Firm* — Pearne & Gordon LLP

(57) ABSTRACT

A camera system 100 has an imaging optical system L, an imaging component 45, a liquid crystal monitor 16, a body microprocessor 12, an aperture setting component 29, and an image display controller 15. The body microprocessor 12 allows a target aperture value and a reference aperture value to be set as set conditions and determines the reference aperture value on the basis of the target aperture value. The aperture setting component 29 adjusts a photography condition on the basis of the set conditions. The image display controller 15 displays part of a reference image a1 acquired by the imaging component 45 at the reference aperture value as a reference display image A1 in a first display region R131 and displays part of a target image b1 acquired by the imaging component 45 at the target aperture value a1 as a target display image B1 in a second display region R132.

9 Claims, 17 Drawing Sheets

(56) References Cited

U.S. PATENT DOCUMENTS

| | | |
|---|---|---|
| 2008/0297625 A1 | 12/2008 | Santo et al. |
| 2008/0297639 A1 | 12/2008 | Honjo et al. |
| 2008/0303936 A1 | 12/2008 | Muramatsu et al. |
| 2009/0128640 A1 | 5/2009 | Yumiki |
| 2009/0153722 A1* | 6/2009 | Fujio et al. ............... 348/333.12 |
| 2009/0268075 A1 | 10/2009 | Yumiki |

FOREIGN PATENT DOCUMENTS

| | | |
|---|---|---|
| JP | 2001-125173 | 5/2001 |
| JP | 2004-241958 A | 8/2004 |
| JP | 2005-079915 A | 3/2005 |
| JP | 2005-274954 A | 10/2006 |
| JP | 2006-311060 A | 11/2006 |
| JP | 2006-313978 A | 11/2006 |

* cited by examiner

CAMERA SYSTEM

CROSS-REFERENCE TO RELATED APPLICATIONS

This application claims priority to Japanese Patent Application No. JP2007-146502 filed on Jun. 1, 2007. The entire disclosure of Japanese Patent Application No. JP2007-146502 is hereby incorporated herein by reference.

BACKGROUND OF THE INVENTION

1. Field of the Invention

The present invention relates to a camera system, and more particularly relates to a camera system with which a plurality of images can be displayed side by side.

2. Background Information

Single-lens reflex digital cameras have become tremendously popular in recent years. With a single-lens reflex digital camera, when an optical viewfinder is used to view a subject, the light incident on the imaging optical system is reflected by a reflecting mirror disposed along the optical path, and is guided to the viewfinder optical system. As a result, the subject image is converted by a pentaprism or the like into an erect image before being guided to the viewfinder optical system. This allows the user to view the subject image formed by the imaging optical system through the optical viewfinder. Thus, the reflecting mirror is usually disposed along the optical path.

Meanwhile, when an optical image of the subject is converted into an image signal, the reflecting mirror is retracted from the optical path so that the light from the imaging optical system will be incident on an imaging element. As a result, opto-electric conversion is performed by the imaging element, and image data about the subject is obtained. When imaging is complete, the reflecting mirror is returned to its home position along the optical path. With a single-lens reflex camera, this operation of the reflecting mirror is the same regardless of whether the camera is a conventional silver halide camera or a digital camera.

However, when the home position of the reflecting mirror lies in the optical path, the light from the imaging optical system is not incident on the imaging element. Therefore, in the case of a digital camera, with the above-mentioned system, a monitor photography mode, in which the user uses the liquid crystal monitor to view the subject, cannot be achieved, and a camera system such as this is inconvenient for a beginner unaccustomed to photography.

In view of this, as discussed in Japanese Laid-Open Patent Application 2001-125173, a single-lens reflex digital camera has been proposed with which a liquid crystal monitor can be used during image capture. With this camera system, in monitor photography mode, the reflecting mirror is retracted from the optical path and the light from the imaging optical system is incident on the imaging element. This allows the subject to be viewed on the liquid crystal monitor.

Also, the imaging element of a single-lens reflex digital camera is generally larger in size than the imaging element of an ordinary compact digital camera. Therefore, when an optical image of the subject is formed on the imaging element, a smaller area is in focus, and the subject field depth tends to be shallow. Therefore, with a single-lens reflex digital camera, it is important to adjust the aperture and confirm the subject field depth.

In view of this, as discussed in Japanese Laid-Open Patent Application H6-6807, a camera system has been proposed with which a plurality of images captured under different photography conditions, for example, can be displayed side by side.

However, if a plurality of images with different photography conditions are merely displayed side by side, the relationship between the photography conditions of the two images will be unclear, making it less convenient to compare images.

SUMMARY OF THE INVENTION

The present invention is a camera system that provides the user with more convenience by allowing a plurality of images to be displayed side by side.

The camera system, according to one aspect of the present invention, includes an imaging optical system, an imaging component, a display component, a condition setting component, a condition adjustment component, and a display control component. The imaging optical system forms an optical image of a subject. The imaging component converts the optical image into an image signal and successively acquires images of the subject. The display component has first and second display regions that allow a plurality of the images acquired by the imaging component to be displayed side by side. The condition setting component allows a first photography condition and a second photography condition to be set as a setting condition, and determines one of the first and second photography conditions on the basis of the other. The condition adjustment component adjusts a photography condition on the basis of the set condition. The display control component control the display component to display as a first display image at least part of a first image acquired by the imaging component under the first photography condition in the first display region, and control the display component to display as a second display image at least part of a second image acquired by the imaging component under the second photography condition in the second display region.

With this camera system, since the second photography condition of the second display image is determined by the condition setting component on the basis of the first photography condition of the first display image, the first display image and the second display image are acquired under related photography conditions. This affords better correlation between images and improves convenience in the comparison of images.

Examples of photography conditions here include the aperture value, the shutter speed, and the exposure value.

The camera system, according to another aspect of the present invention, wherein the condition setting component allows a third photography condition to be set as the set condition, and the third photography condition is determined on the basis of either the first or second photography condition. When the third photography condition is determined on the basis of the first photography condition, the display control component controls the display component to display the first and third display images side by side instead of the second display image. When the third photography condition is determined on the basis of the second photography condition, the display control component controls the display component to display the second and third display images side by side instead of the first display image.

The camera system, according to yet another aspect of the present invention, wherein when the third photography condition is determined on the basis of the first photography condition, the display control component controls the display component to display the first display image in the second display region, and displays the third display image in the first display region. When the third photography condition is determined on the basis of the second photography condition, the display control component controls the display component to display the second display image in the first display region, and displays the third display image in the second display region.

The camera system, according to still another aspect of the present invention, wherein the condition setting component changes one of the first or second photography condition then determines the setting condition of the other by a specific width.

The term "a specific width" here means, for example, the variable width of the aperture value or the exposure value (EV). If the specific width is the aperture value, one step, etc., can be the specific width, and when the specific width is the exposure value, ½ EV, ⅓ EV, etc., can be the specific width.

The camera system, according to another aspect of the present invention, further includes a condition input component with which either the first or second photography condition can be inputted.

These and other features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Embodiments of the present invention will now be described through reference to the drawings.

1: Overall Configuration of Camera System

Figure 1:
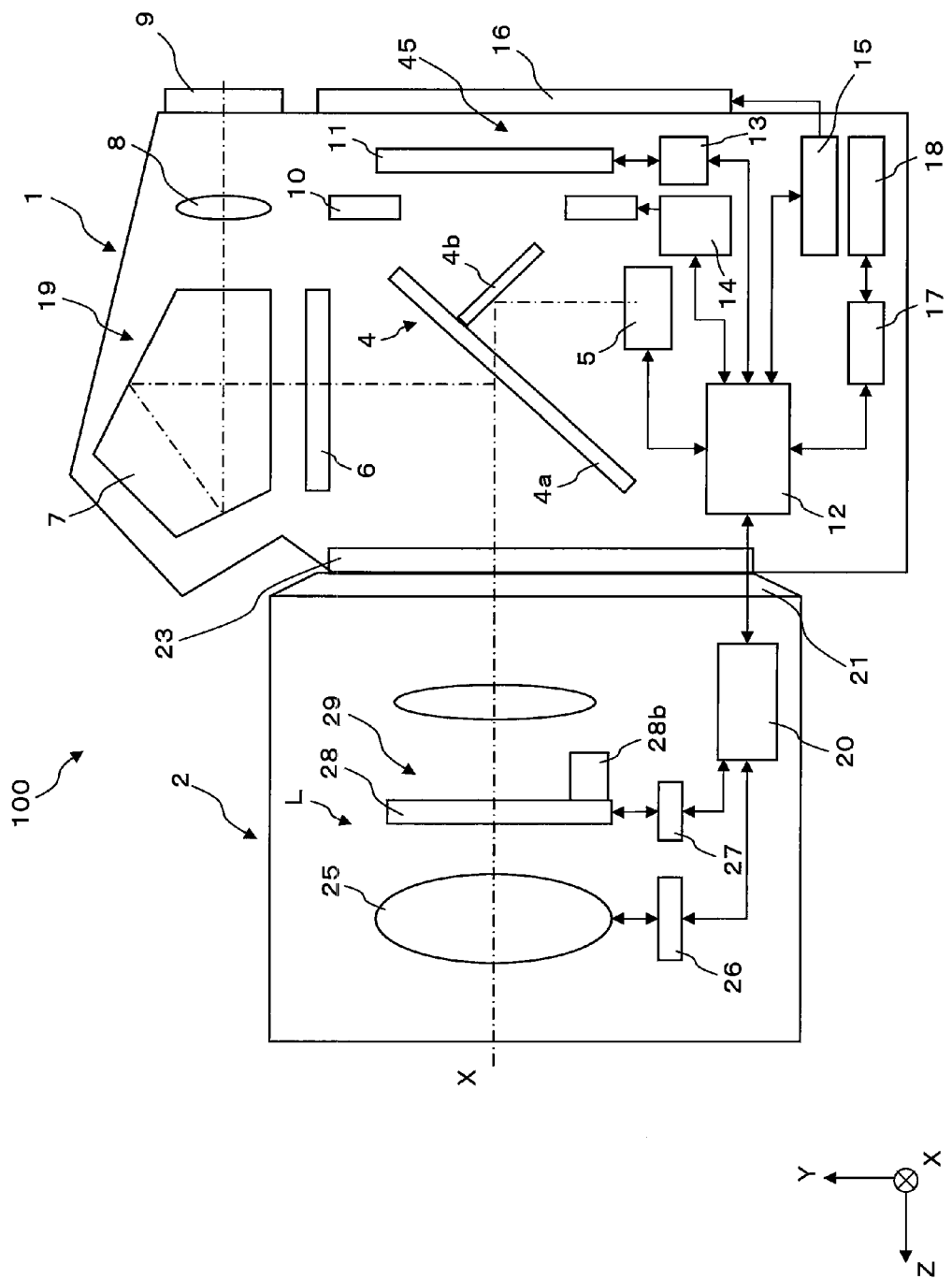
FIG. 1 is a block diagram of a control system for an interchangeable lens unit and digital camera main body pertaining to a first embodiment of the present invention.

The camera system 100 pertaining to the first embodiment of the present invention will be described. FIG. 1 is a diagram of the overall configuration of the camera system 100 pertaining to the first embodiment of the present invention.

The camera system 100 shown in FIG. 1 is an interchangeable lens type of single-lens reflex digital camera system. The camera system 100 includes a camera main body 1 and an interchangeable lens unit 2.

The camera system 100 and the interchangeable lens unit 2 exchange various control signals via an electrical contact (not shown) of a lens mount 21 on the interchangeable lens unit 2 side and an electrical contact (not shown) of a body mount 23 on the camera system 100 side.

1.1: Configuration of Interchangeable Lens Unit

The interchangeable lens unit 2 mainly includes an imaging optical system L, an aperture setting component 29 for adjusting the aperture of the imaging optical system L, and a lens microprocessor 20 for controlling various sequences of the interchangeable lens unit 2. The interchangeable lens unit 2 has the lens mount 21 and is removably mounted to the body mount 23 provided to the body front face of the camera main body 1.

The interchangeable lens unit 2 has the imaging optical system L for forming an optical image of a subject. Also, the lens microprocessor 20 is mounted to control the various sequences of the interchangeable lens unit 2 and to hold various kinds of lens information. A focus controller 26 is mounted inside the interchangeable lens unit 2 for controlling the drive of a focus lens group 25. An aperture controller 27 is also mounted for controlling an aperture unit 28.

The imaging optical system L mainly includes the focus lens group 25 and the aperture unit 28.

The aperture setting component 29 mainly includes an aperture ring 40 which the user can turn to input aperture values, an aperture linear sensor 41 for outputting a physical quantity according to the rotational angle of the aperture ring 40, a diaphragm drive motor 28b for driving diaphragm blades, and the aperture controller 27 for adjusting the aperture to be equal to the set aperture value.

The lens microprocessor 20 is a control device serving as the functional center of the interchangeable lens unit 2. The lens microprocessor 20 is connected to various components mounted in the interchangeable lens unit 2 and controls various sequences of the interchangeable lens unit 2. For example, a CPU and a memory 69 are installed in the lens microprocessor 20, and various functions can be realized by having the CPU read programs stored in the memory 69. The lens microprocessor 20 output commands (such as control signals) to the focus controller 26, the aperture controller 27, a shift controller 47, and other devices in the camera system, and therefore can execute control over the focus controller 26, the aperture controller 27, the shift controller 47, and the other devices in the camera system. Also, the lens microprocessor 20 is connected via an interface with a body microprocessor 12 and communicates with this body microprocessor 12.

1.2: Configuration of Camera Main Body

The camera main body 1 generally includes a quick return mirror 4, a focus detection unit 5, a shutter unit 10, a viewfinder optical system 19, an imaging component 45, an image display component 46, a photography mode switching component 48, a depth of field reviewing mode setting component 49, a shutter controller 14, an image recorder 18, and the body microprocessor 12. The quick return mirror 4 varies the path taken by light from the subject. The focus detection unit 5 is used for performing focus detection. The shutter unit 10 opens and closes the shutter. The viewfinder optical system 19 is used for viewing a subject image. The imaging component 45 is used for acquiring a subject image as a photographic image. The image display component 46 is for displaying a photographic image. The photography mode switching component 48 is used for switching between photography modes. The depth of field reviewing mode setting component 49 is for setting to depth of field reviewing mode. The shutter controller 14 controls the shutter unit 10, and the image recorder 18 records a photographic image. The body microprocessor 12 is used for controlling various sequences of the camera main body 1.

The viewfinder optical system 19 constitutes an observation optical system, the quick return mirror 4 constitutes a movable mirror, a photography mode switching button 75 and the body microprocessor 12 constitute the photography mode switching component 48, and a depth of field reviewing button 76 and the body microprocessor 12 constitute the depth of field reviewing mode setting component 49.

Subject light that has passed through the interchangeable lens unit 2 is split into two beams (reflected light beam and transmitted light beam) by a main mirror 4a of the quick return mirror 4, and the reflected beam is guided to the viewfinder optical system 19. The transmitted beam, meanwhile, is reflected by a sub-mirror 4b provided on the rear face side of the quick return mirror 4, and is utilized as an AF light beam for the focus detection unit 5. The focus detection unit 5 generally makes use of a phase difference detection method.

The light beam reflected by the main mirror 4a forms an image on a viewfinder screen 6. The subject image formed on the viewfinder screen 6 can be observed through a viewfinder eyepiece window 9 via a pentaprism 7 and an eyepiece 8.

The body microprocessor 12 that controls various sequences is installed in the camera system 100. An imaging sensor controller 13 controls the drive of an imaging sensor 11. The shutter controller 14 controls the drive of the shutter unit 10. An image display controller 15 reads image data from the imaging sensor 11 and performs specific image processing, after which the photographic image is displayed on a liquid crystal monitor 16. An image recording controller 17 reads and writes photographic images through the image recorder 18 from and to a recording medium such as an SD card (not shown).

The quick return mirror 4 generally includes the main mirror 4a that is capable of reflecting and transmitting incident light, and a sub-mirror 4b that is provided on the rear face side of the main mirror 4a and reflects transmitted light from the main mirror 4a. The quick return mirror 4 can be flipped up outside the optical path X by a quick return mirror controller 60. This quick return mirror 4 is disposed so as to be movable between the position shown in FIG. 2 and the position shown in FIG. 3. Also, incident light is split into two beams by the main mirror 4a. The reflected beam is guided to the viewfinder optical system 19, while the transmitted beam is reflected by the sub-mirror 4b and guided to the focus detection unit 5.

The viewfinder optical system 19 generally includes the viewfinder screen 6 where an image of the subject is formed, the pentaprism 7 for converting the subject image into an erect image, the eyepiece 8 for guiding the erect image of the subject to the viewfinder eyepiece window 9, and the viewfinder eyepiece window 9 through which the user can see the subject.

The focus detection unit 5 is a unit for detecting whether or not an image formed by light from the subject is in a focused state (detecting focus) from the light reflected by the sub-mirror 4b. The focus detection unit 5 also performs focus detection by a standard phase difference detection method, for example.

The imaging component 45 generally includes the imaging sensor 11 (such as a CCD) for performing opto-electric conversion and the imaging sensor controller 13 for controlling the imaging sensor 11, and acquires the subject image as a photographic image. The imaging component 45 converts the subject image produced by incident light into an electrical signal for forming a photographic image.

The image display component 46 includes the liquid crystal monitor 16 and the image display controller 15 that controls the operation of the liquid crystal monitor 16. The image recorder 18 records and reproduces photographic images to and from a card-type recording medium (not shown), for example. The image recorder 18 is controlled by the image recording controller 17, which controls the operation of the image recorder 18. The liquid crystal monitor 16 has two display regions, for example, so that a plurality of images can be displayed side by side. The image display controller 15 is able to display different images separately in two display regions of the liquid crystal monitor 16.

The body microprocessor 12 is a control device serving as the functional center of the camera main body 1 and controls various sequences. The body microprocessor 12, for example, is equipped with a CPU, ROM, and RAM. The body microprocessor 12 can perform many different functions when programs held in the ROM are read by the CPU. The body microprocessor 12 outputs commands (such as control signals) to the shutter controller 14, the imaging sensor controller 13, the image display controller 15, the image recording controller 17, etc., and therefore can executes control over the shutter controller 14, the imaging sensor controller 13, the image display controller 15, the image recording controller 17, etc. Also, the body microprocessor 12 is connected via an interface with the lens microprocessor 20 and communicates with this lens microprocessor 20.

As will be discussed below, the body microprocessor 12 further has the function of setting the indicated value as the target aperture value, determining the reference aperture value based on the target aperture value, resetting the target aperture value and the reference aperture value in accordance with the operation of the aperture ring 40. The body microprocessor 12 is an example of the condition setting component with which the photography conditions are set. Also, the body microprocessor 12 can send a control signal to the aperture controller 27 so that the aperture value of the aperture setting component 29 will be the target aperture value or the reference aperture value.

1.3: Viewfinder Photography Mode and Monitor Photography Mode

This camera system 100 has a viewfinder photography mode and monitor photography mode as its photography modes. The viewfinder photography mode is a mode in which the user looks through the viewfinder eyepiece window 9 to see the subject. The viewfinder photography mode is considered the ordinary photography mode for a conventional single-lens reflex camera.

Figure 2:
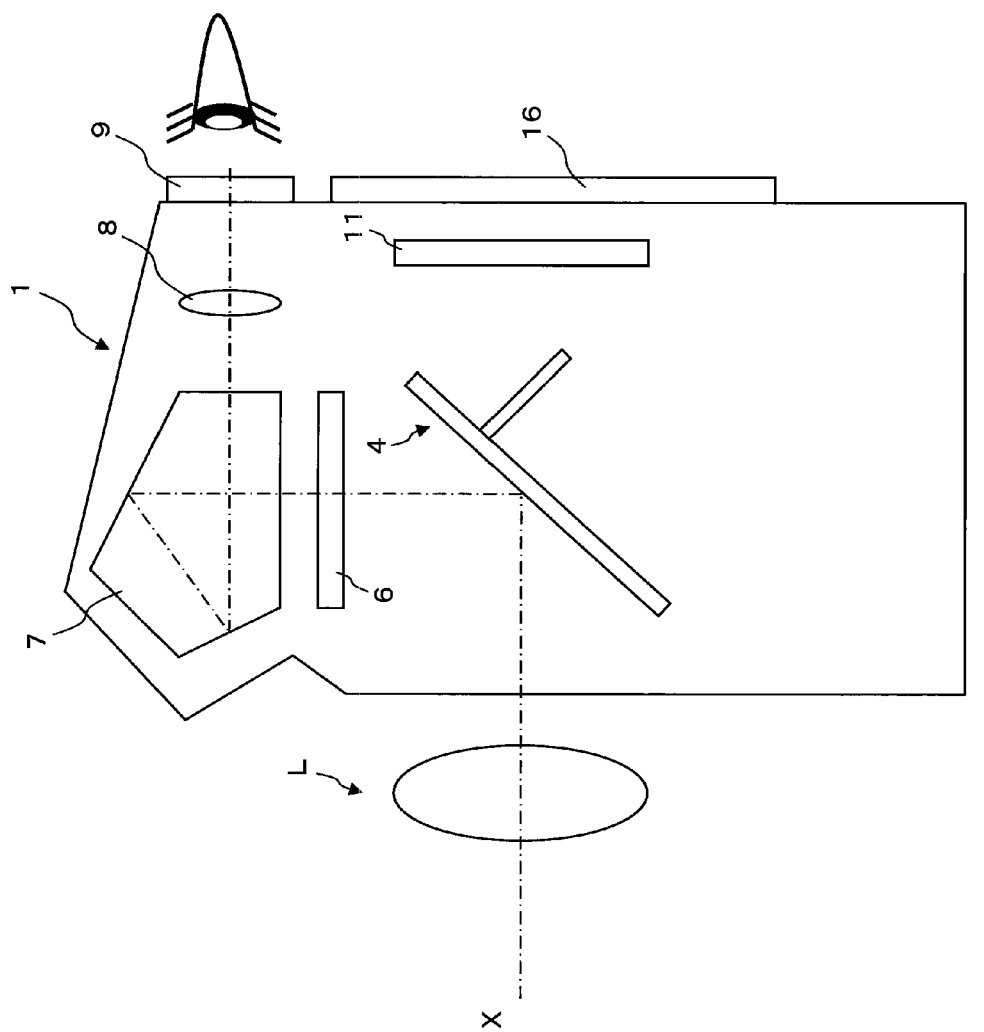
FIG. 2 is a concept diagram illustrating a viewfinder photography mode pertaining to the first embodiment of the present invention.

In this viewfinder photography mode, as shown in FIG. 2, the quick return mirror 4 is disposed in a specific position in optical path X, and subject light is guided to the viewfinder optical system 19, so the user can see the subject image through the viewfinder eyepiece window 9. During actual photography, the quick return mirror 4 flips up outside the optical path X, and the shutter unit 10 is opened so that the subject image is formed on the imaging face of the imaging sensor 11.

Figure 3:
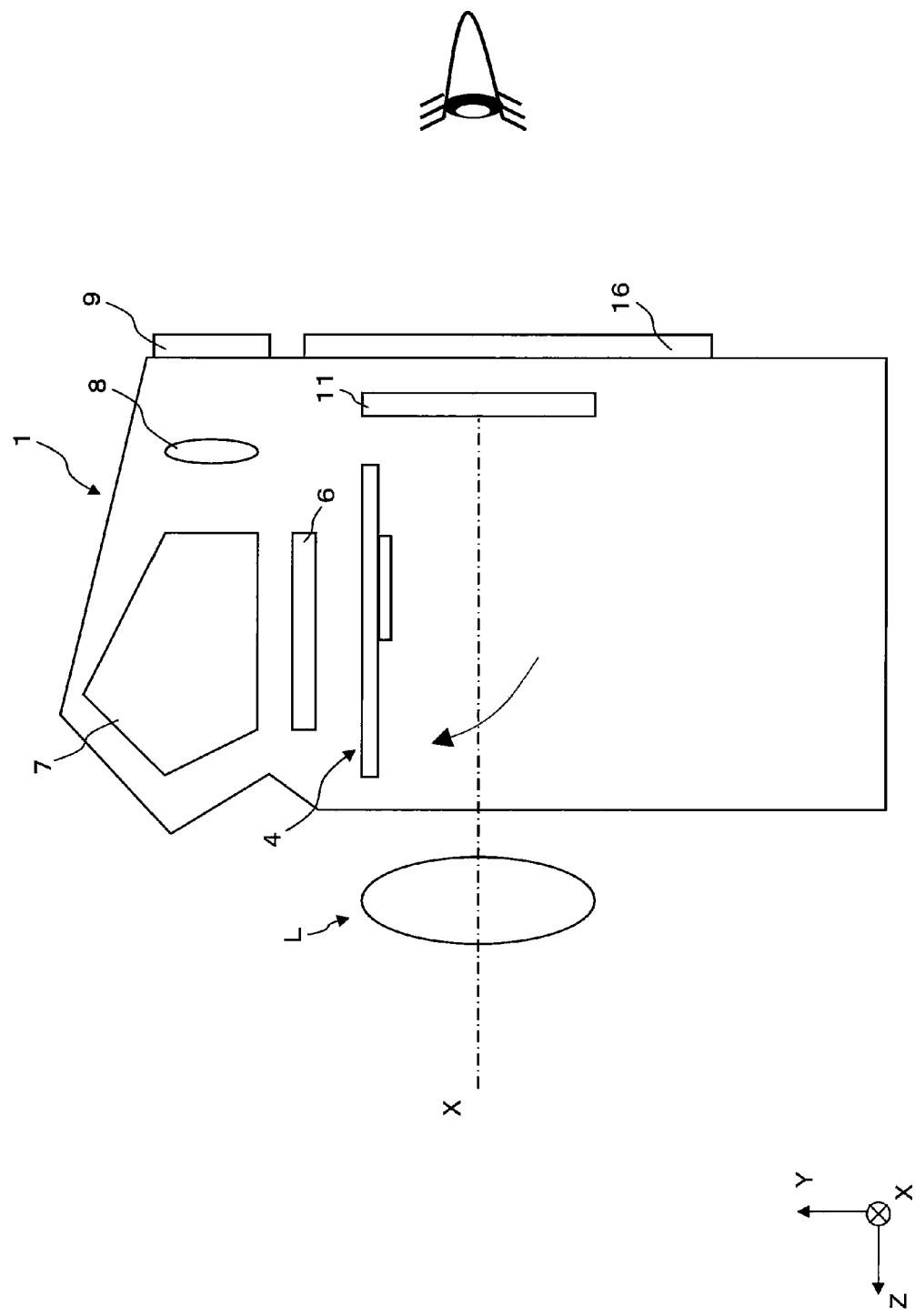
FIG. 3 is a concept diagram illustrating a monitor photography mode pertaining to the first embodiment of the present invention.

The monitor photography mode is a mode in which the user takes a photo while looking at the subject displayed on the liquid crystal monitor 16. In the monitor photography mode, as shown in FIG. 3, the quick return mirror 4 is retracted from the optical path X. The subject image, or what is known as a through-image, is displayed on the liquid crystal monitor 16 via the imaging sensor 11.

1.4: Configuration of Interchangeable Lens Unit

Figure 4:
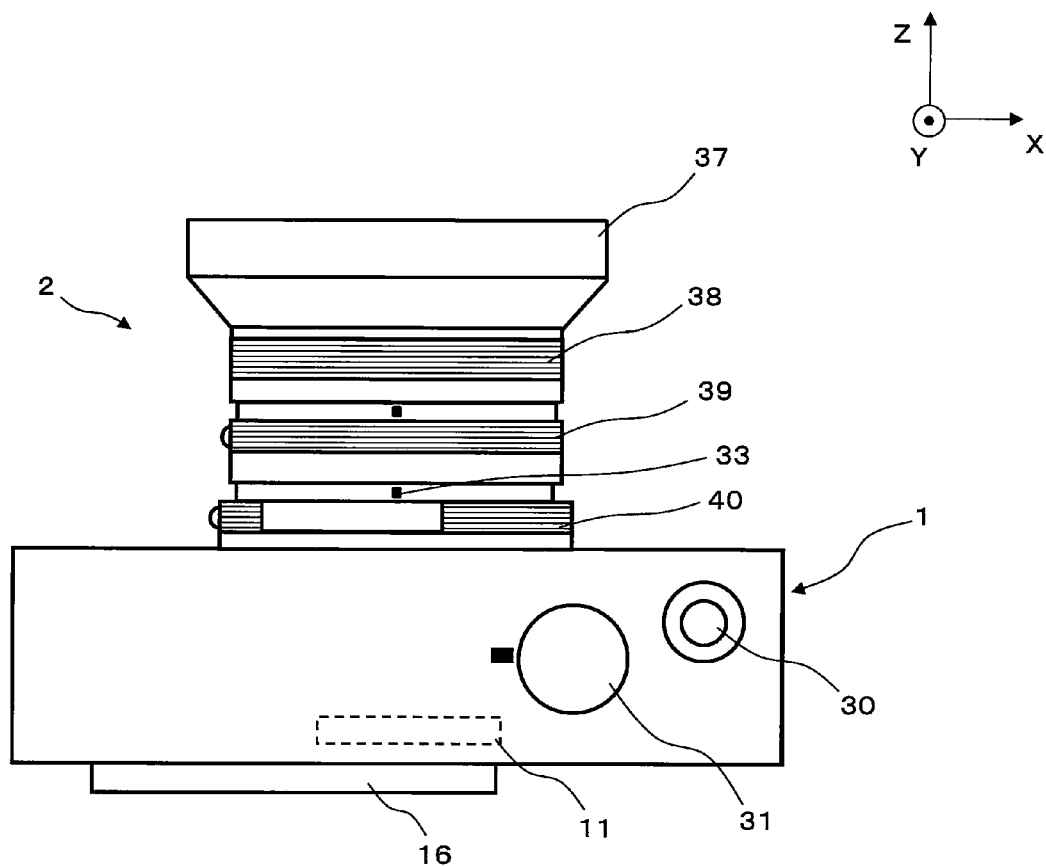
FIG. 4 is a top view of a digital camera pertaining to the first embodiment of the present invention.

FIG. 4 is a top view of the camera system 100 to which has been attached the interchangeable lens unit 2 pertaining to the first embodiment of the present invention. The X, Y, and Z axes are defined as shown in FIG. 4 (assuming the Z axis to be parallel to the optical axis of the lenses constituting the imaging optical system L).

The camera system 100 has a housing that is held by the user when the subject is being photographed. This camera system 100 includes a release button 30 and a shutter speed setting dial 31. The release button 30 and shutter speed setting dial 31 are provided on the right side of the upper face of the camera main body 1.

The shutter speed setting dial 31 is a control member that is turned to set the shutter speed. Also, the shutter speed setting dial 31 has an auto position in which the shutter speed is set automatically.

The main body of the camera system 100 includes the liquid crystal monitor 16. The liquid crystal monitor 16 is provided on the side of the camera system 100 main body that faces the user. The operation of the liquid crystal monitor 16 will be described below.

The interchangeable lens unit 2 has a filter mount 37 on the side closest to the subject (the positive side in the Z axial direction). The interchangeable lens unit 2 has a zoom ring 38, a focus ring 39, and the aperture ring 40, in that order from the filter mount 37 toward the camera system 100 main body side (the negative direction of the Z axis). The zoom ring 38, focus ring 39, and aperture ring 40 are all cylindrical rotating control members and are rotatably disposed around the outer peripheral face of the interchangeable lens unit 2.

1.5: Configuration of Rear Face of Camera Main Body

Figure 5:
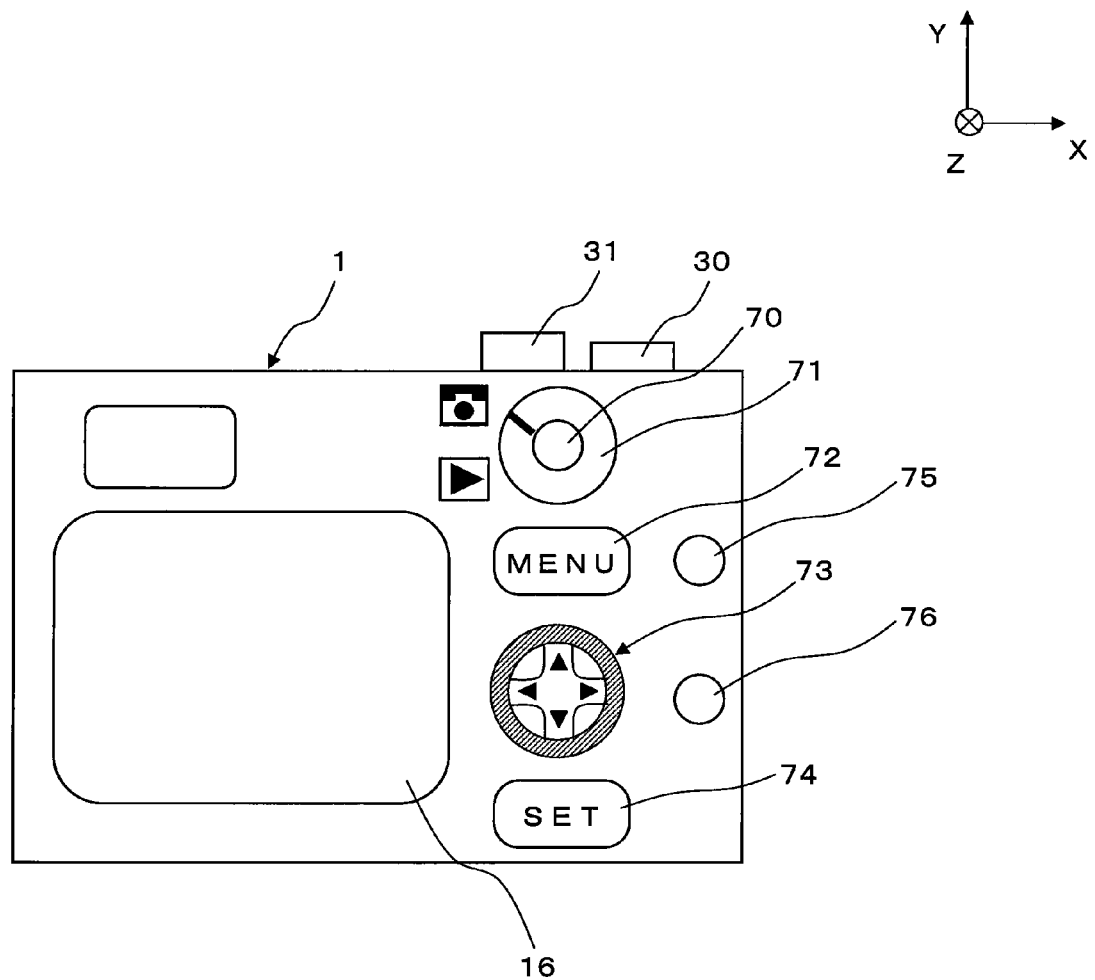
FIG. 5 is a rear view of the digital camera pertaining to the first embodiment of the present invention.

FIG. 5 is a rear view of the camera system 100 pertaining to the first embodiment of the present invention. The camera system 100 main body includes a power button 70, a photography/reproduction mode switching lever 71, a menu button 72, a directional arrow key 73, a set button 74, and a depth of field reviewing button 76.

The power button 70 is a control member that is operated to turn the power on and off to the camera system 100. The photography/reproduction mode switching lever 71 is a control member that is operated to switch between a photography mode and a reproduction mode by switching a lever. The photography mode referred to here is a mode that is set to capture a new subject image and create an image signal with the camera system 100. The reproduction mode is a mode that is set to display an image signal already captured and stored in the camera system 100.

The menu button 72 is a control member that is operated to display various operation menus on the liquid crystal monitor 16. The directional arrow key 73 has an up, a down, a left, and a right arrow key. The directional arrow key 73 is a control member that is operated to select displayed categories from various operation menus. The set button 74 is a control member that is operated to set the display categories on various operation menus.

The depth of field reviewing button 76 is a button for changing to a depth of field reviewing mode, which is discussed below. With the camera system 100, the user presses this depth of field reviewing button 76 to change to depth of field reviewing mode.

1.6: Aperture

Figure 6A:
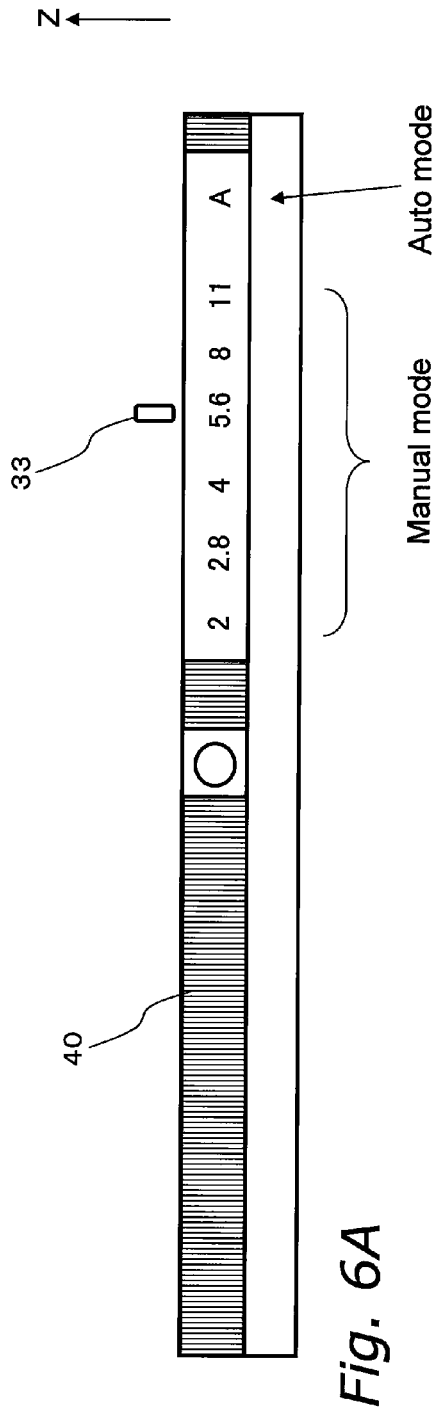
FIG. 6A is a development diagram of the outer peripheral face of an aperture ring pertaining to the first embodiment of the present invention.
Figure 6B:
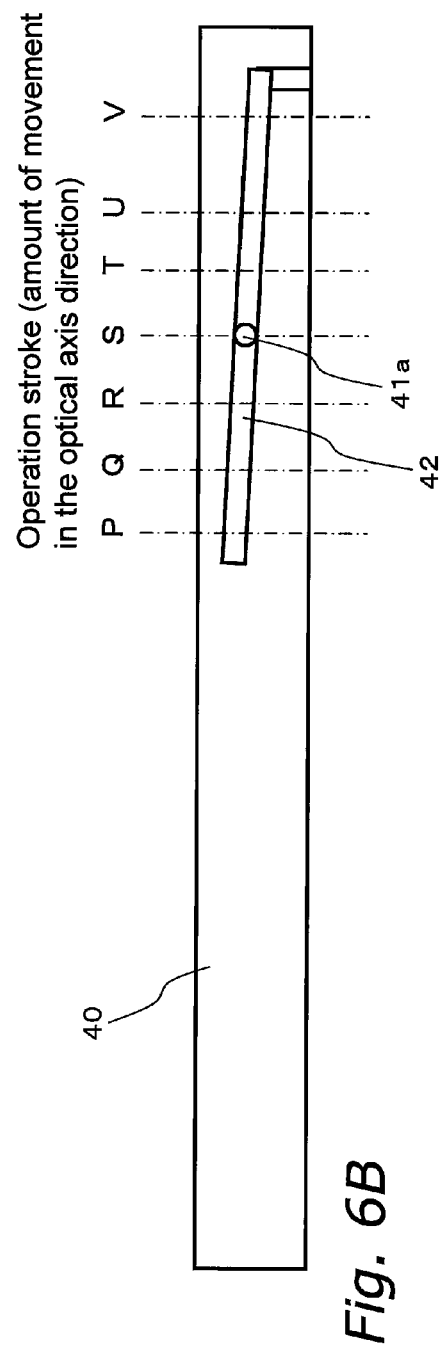
FIG. 6B is a development diagram of the inner peripheral face of the aperture ring pertaining to the first embodiment of the present invention.

The aperture ring 40 has a cylindrical shape. FIG. 6A is a development diagram of the outer peripheral face of the aperture ring pertaining to the first embodiment of the present invention. FIG. 6B is a development diagram of the inner peripheral face of the aperture ring pertaining to the first embodiment of the present invention.

As shown in FIGS. 4 and 6a, aperture values are displayed on the outer peripheral face of the aperture ring 40. The display region of the aperture values is divided into two regions. In FIG. 6A, each display portion of 1AV (aperture value) from "2" to "11" corresponds to the aperture value of the manual region. Also, in FIG. 6A, the display portion "A" corresponds to the aperture value of the auto region. As shown in FIGS. 4 and 6b, the aperture ring 40 has a straight cam groove 42 on its inner peripheral face. The aperture value need not only be selected in 1AV increments.

The interchangeable lens unit 2 has the aperture unit 28 in its interior. The aperture unit 28 includes in its interior the diaphragm drive motor 28b for driving aperture blades (not shown). The diaphragm drive motor 28b drives the aperture blades in accordance with the rotational angle of the aperture ring 40 by control which will be described later. The aperture value of the imaging optical system L is changed by driving these aperture blades.

Figure 7:
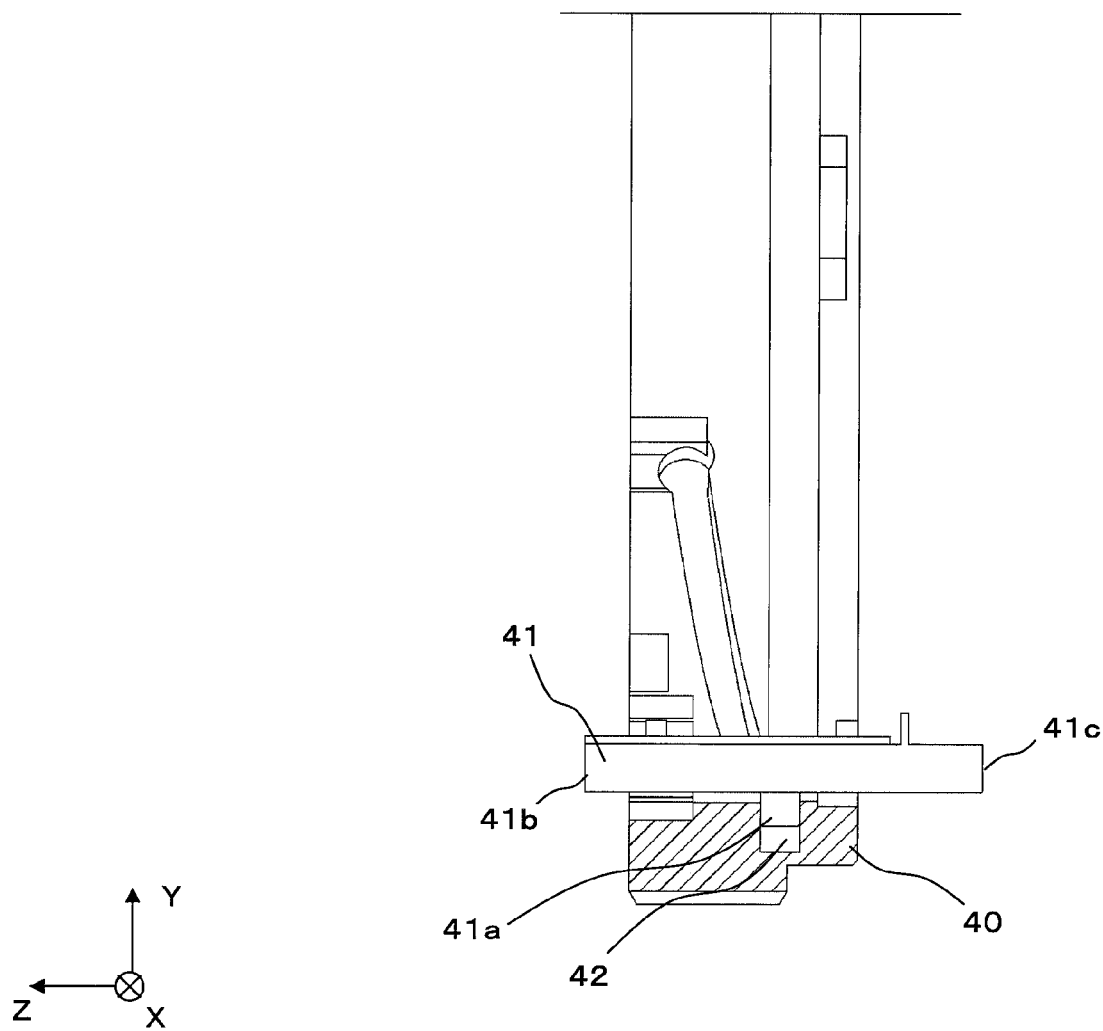
FIG. 7 is a partial cross section showing the linkage of an aperture linear sensor and the aperture ring pertaining to the first embodiment of the present invention.

FIG. 7 is a partial cross section showing the linkage of the aperture linear sensor 41 and the aperture ring 40 pertaining to the first embodiment of the present invention. The aperture linear sensor 41 includes a slider 41a that has a cylindrical shape that protrudes to the outside of the aperture ring 40 in the radial direction. The cam groove 42 formed in the aperture ring 40 links with the slider 41a of the aperture linear sensor 41.

Figure 8B:
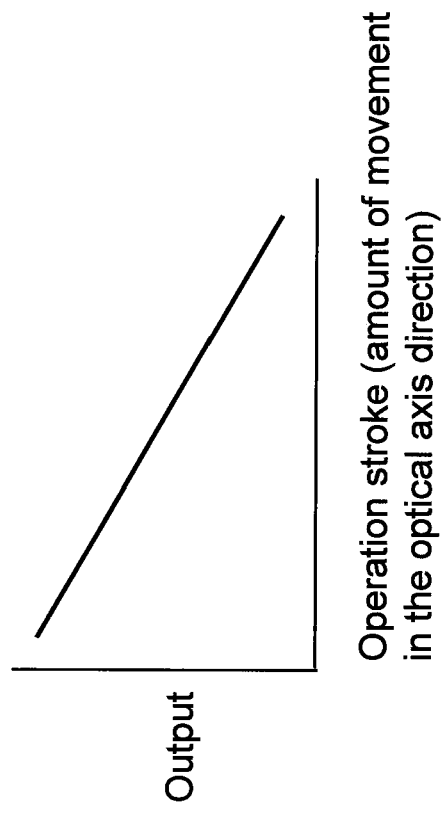
FIG. 8B is a graph of the output of the aperture linear sensor of the lens barrel in the first embodiment of the present invention.
Figure 8A:
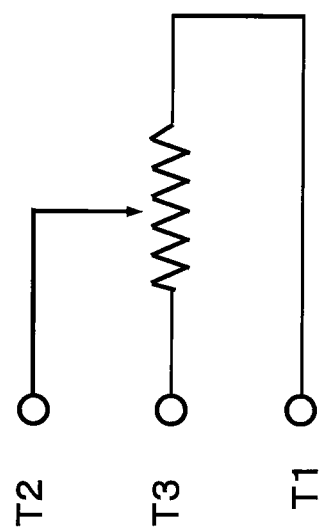
FIG. 8A is a circuit diagram of the aperture linear sensor of a lens barrel in the first embodiment of the present invention.

This aperture linear sensor 41 is mainly constituted by a circuit having a varistor as shown in FIG. 8A. The terminal T2 in FIG. 8A is connected to the slider 41a in FIG. 7, while the terminals T2 and T3 are connected to the two ends 41b and 41c of the aperture linear sensor in FIG. 7. When a specific voltage is applied between the terminals T1 and T3, the cylindrical slider 41a provided to the aperture linear sensor 41 slides over a magnetic resistor (not shown) inside the aperture linear sensor 41, causing the output of the terminal T2 (output voltage) to vary linearly as shown in FIG. 8B.

Figure 9:
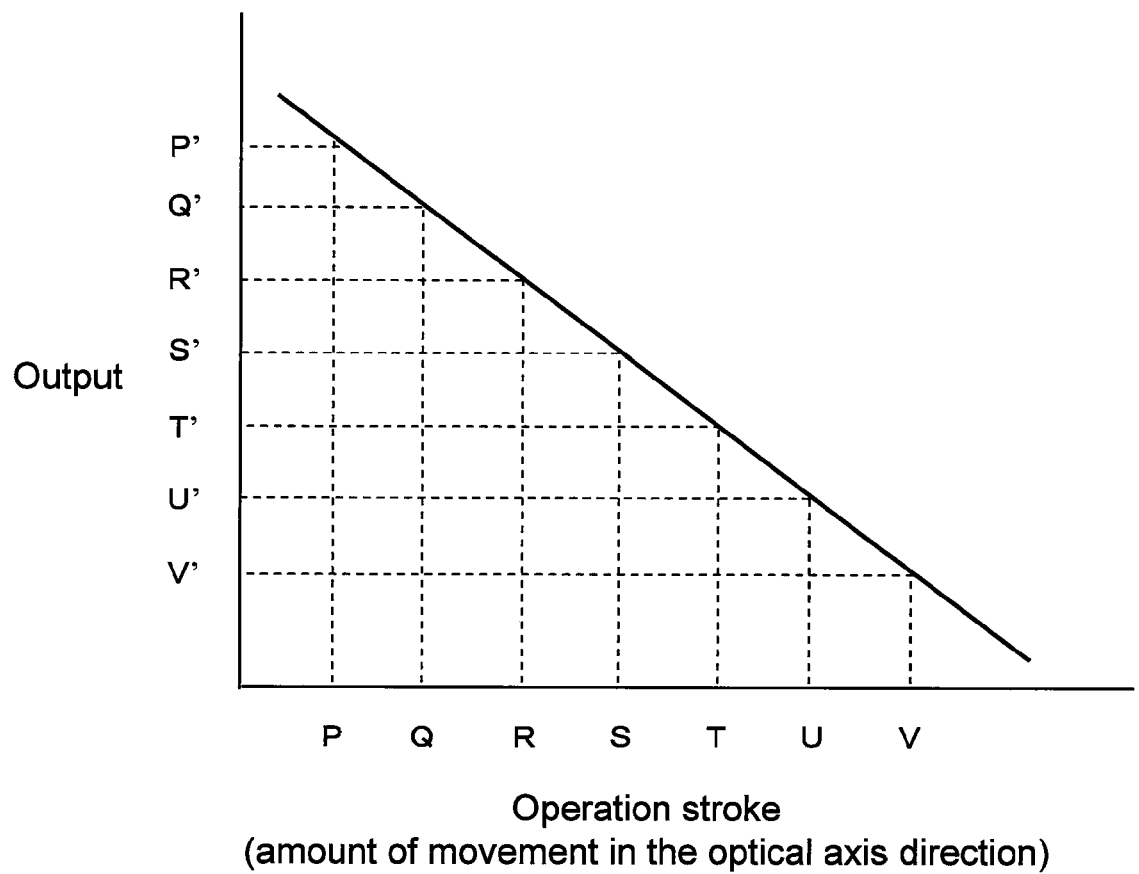
FIG. 9 is a graph of the relationship between the output value of the aperture linear sensor and the rotational angle of the aperture ring pertaining to the first embodiment of the present invention.

FIG. 9 is a graph showing the relationship between the output value of the aperture linear sensor 41 (output voltage value) and the rotational angle of the aperture ring 40 pertaining to the first embodiment of the present invention. In FIGS. 4 and 6, when the aperture ring 40 is turned until the number "2" displayed on the aperture ring 40 matches up with a pointer 33, the slider 41a of the aperture linear sensor 41 is in the position P on the cam groove 42. In this case, the output value of the aperture linear sensor 41 (output voltage value) is P'. That is, P' is the output voltage value of the aperture linear sensor 41 corresponding to the rotational angle of the aperture ring 40 when the number "2" displayed on the aperture ring 40 matches up with the pointer 33.

Similarly, when the aperture ring 40 is turned until the positions where the numbers "2," "2.8," "4," "5.6," "8," "11," and "A" are displayed on the aperture ring 40 match up with the position of the pointer 33, the slider 41a of the aperture linear sensor 41 is in the positions P, Q, R, S, T, U, and V, respectively, on the cam groove 42. In this case, the output values of the aperture linear sensor 41 (output voltage values) are P', Q', R', S', T', U', and V', respectively. That is, P', Q', R', S', T', U', and V' are the output voltage values of the aperture linear sensor 41 corresponding to the rotational angle of the aperture ring 40 when the positions where the numbers "2," "2.8," "4," "5.6," "8," "11," and "A," respectively, displayed on the aperture ring 40 match up with the position of the pointer 33.

Thus, the aperture linear sensor 41 indicates the output (output voltage value) that corresponds in a one-to-one ratio to the rotational angle of the aperture ring 40. Therefore, the rotational angle of the aperture ring 40 can be detected by the aperture linear sensor 41. The aperture linear sensor 41 outputs as a voltage change an aperture value signal corresponding to a rotational angle.

1.7: Control System for Camera Main Body

Figure 10:
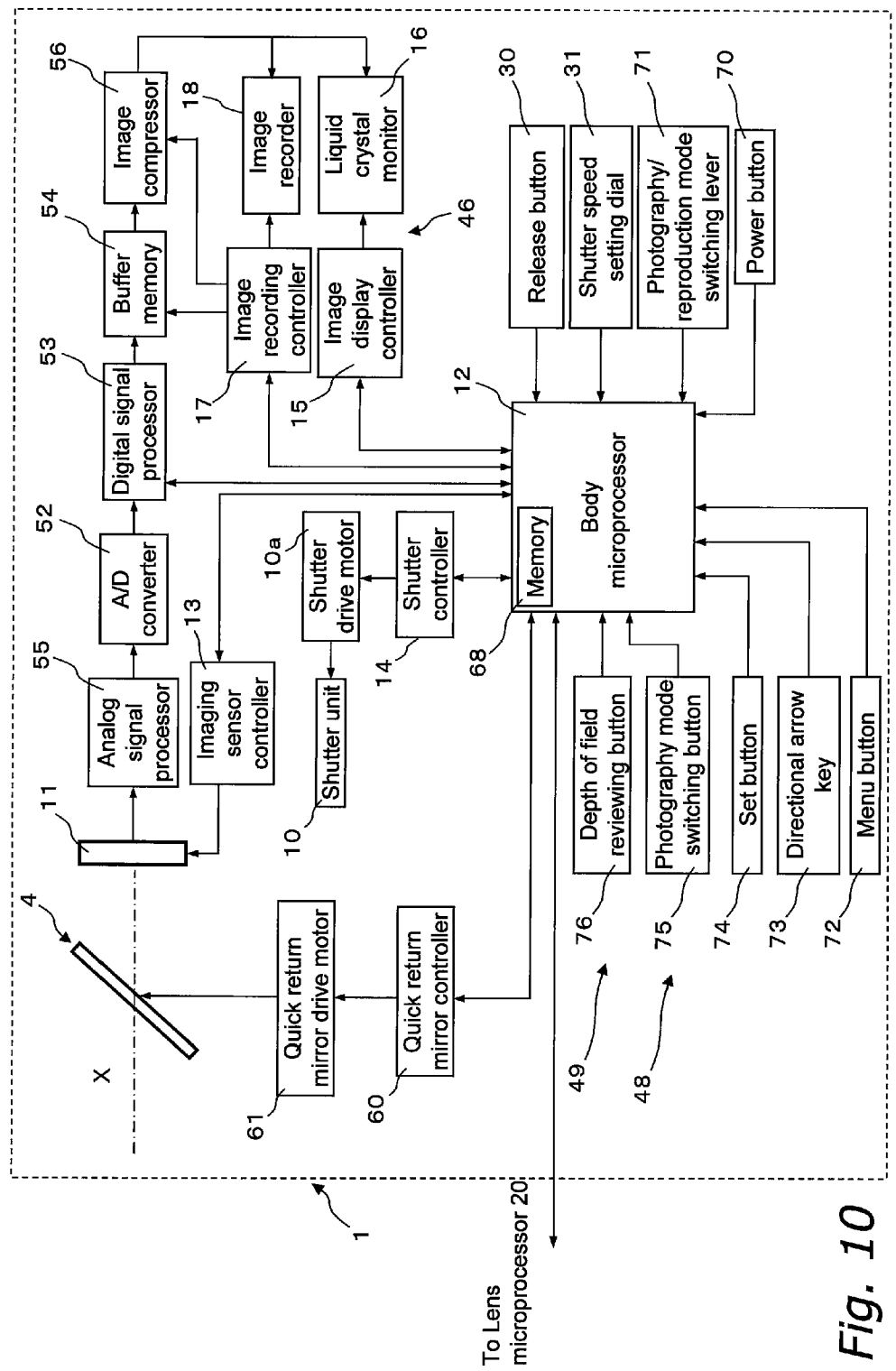
FIG. 10 is a block diagram of the control system inside the digital camera pertaining to the first embodiment of the present invention.

FIG. 10 is a block diagram of the control system of the camera system 100 pertaining to the first embodiment of the present invention.

The body microprocessor 12 can receive signals from the release button 30, the shutter speed setting dial 31, the photography/reproduction mode switching lever 71, the menu button 72, the directional arrow key 73, the set button 74, a photography mode switching button 75, and the depth of field reviewing button 76. Also, the body microprocessor 12 can send signals to the shutter controller 14 and the quick return mirror controller 60. Furthermore, the body microprocessor 12 can perform bidirectional communication between the body microprocessor 12 and the image recording controller 17, between the body microprocessor 12 and the image display controller 15, and between the body microprocessor 12 and a digital signal processor 53. The body microprocessor 12 also has a memory 68 for storing signals.

The shutter controller 14 drives a shutter drive motor 10a on the basis of a control signal from the body microprocessor 12. The quick return mirror controller 60 drives a quick return mirror drive motor 61 on the basis of a control signal from the body microprocessor 12.

The release button 30 sends information indicating shutter timing to the body microprocessor 12. The shutter speed setting dial 31 sends set shutter speed information and shutter motor information.

The imaging sensor 11 is constituted by a CCD (charge coupled device) or the like. The imaging sensor 11 converts an optical image formed by the imaging optical system L of the interchangeable lens unit 2 into an electrical image signal. The drive of the imaging sensor 11 is controlled by the imaging sensor controller 13. The image signal outputted from the imaging sensor 11 is processed by an analog signal processor 55, an A/D converter 52, a digital signal processor 53, a buffer memory 54, and an image compressor 56, in that order.

An image signal is sent from the imaging sensor 11 to the analog signal processor 55. The analog signal processor 55 subjects the image signal outputted by the imaging sensor 11 to analog signal processing, such as gamma processing. The image signal outputted from the analog signal processor 55 is sent to the A/D converter 52. The A/D converter 52 converts the analog image signal outputted from the analog signal processor 55 into a digital signal.

The image signal outputted from the A/D converter 52 is sent to the digital signal processor 53. The digital signal processor 53 subjects the image signal converted into a digital signal by the A/D converter 52 to digital signal processing, such as noise elimination or contour enhancement. The image signal outputted from the digital signal processor 53 is sent to the buffer memory 54. The buffer memory 54 temporarily stores the image signal processed by the digital signal processor 53. The buffer memory 54 consists of a RAM (random access memory) or the like.

The image signal outputted from the buffer memory 54 is sent to the image compressor 56 according to a command from the image recording controller 17. The image compressor 56 subjects the image signal to compression processing according to a command from the image recording controller 17. The image signal is compressed to a data size that is smaller than that of the original data. The compression method, for example, can be JPEG (Joint Photographic Experts Group).

The compressed image signal is sent from the image compressor 56 to the image recorder 18 and the liquid crystal monitor 16. Meanwhile, the body microprocessor 12 sends a control signal to the image recording controller 17 and the image display controller 15. The image recording controller 17 controls the image recorder 18 on the basis of a control signal from the body microprocessor 12. The image display controller 15 controls the liquid crystal monitor 16 on the basis of a control signal from the body microprocessor 12.

The image recorder 18 records the image signal to an internal memory and/or removable memory on the basis of a command from the image recording controller 17. The image recorder 18 records information to be stored along with the image signal to an internal memory and/or removable memory on the basis of a command from the image recording controller 17. The information to be stored along with the image signal includes the date and time the image was captured, focal distance information, shutter speed information, aperture value information, and photography mode information.

The liquid crystal monitor 16 displays the image signal as a visible image on the basis of a command from the image display controller 15. The liquid crystal monitor 16 displays information to be displayed along with the image signal on the basis of a command from the image display controller 15. The information to be displayed along with the image signal includes focal distance information, shutter speed information, aperture value information, photography mode information, and focus state information.

Also, the liquid crystal monitor 16 displays a setting screen to be set by the user, etc., in a specific photography/reproduction mode on the basis of a command from the image display controller 15.

When the user, etc., captures an image, the power button 70 is switched on and the photography/reproduction mode switching lever 71 is put in the photography mode. This turns on the power to the camera system 100 main body, and an optical image of the subject which has been converted into an electrical image signal by the imaging sensor 11 is displayed as a visible image on the basis of a command from the image display controller 15.

When the camera system 100 is in its photography mode and the user presses the menu button 72, the liquid crystal monitor 16 displays the setting categories that can be changed by the user in photography mode as an iconized setting menu screen on the basis of a command from the image display controller 15.

1.8: Interchangeable Lens Unit Control System

Figure 11:
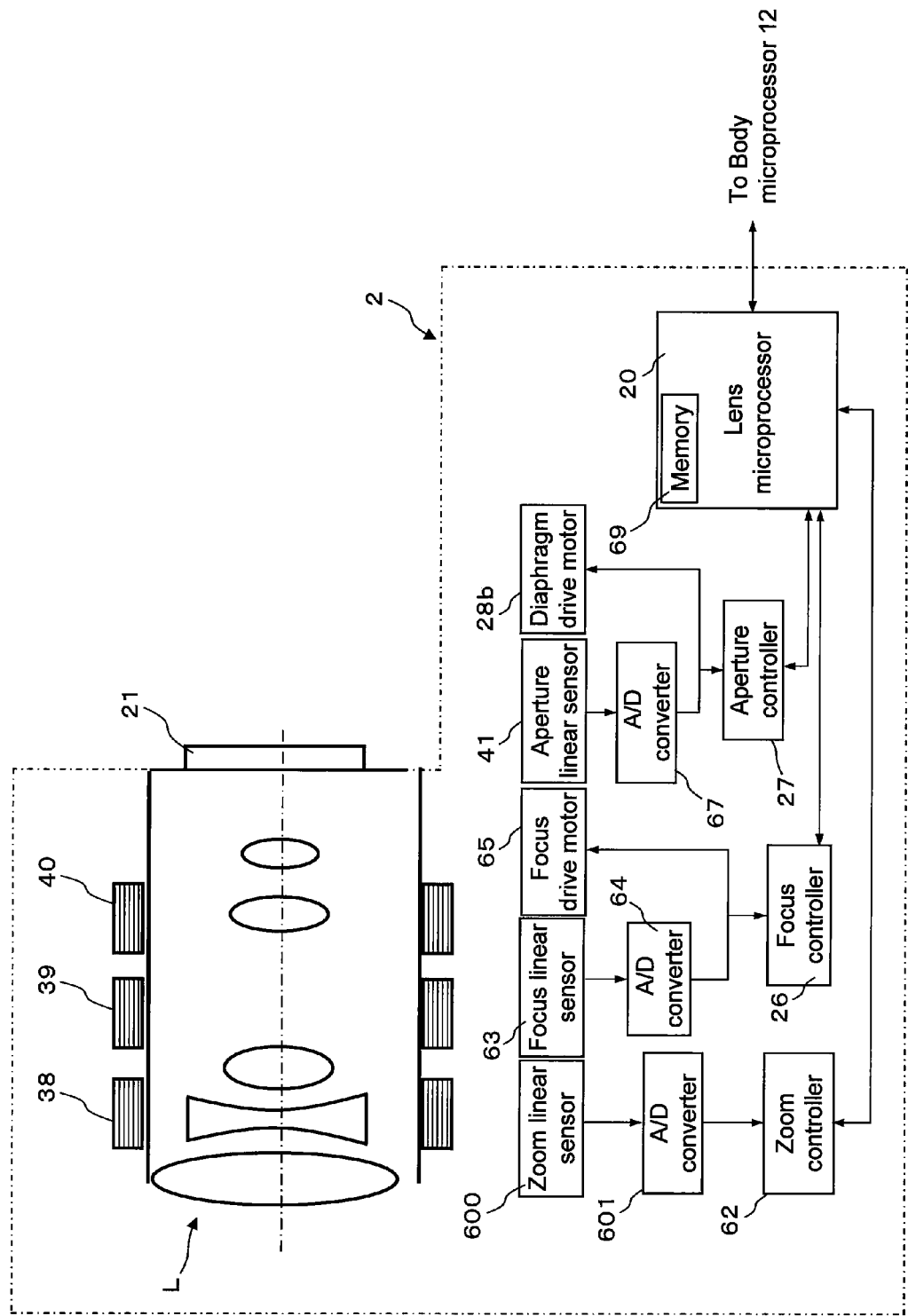
FIG. 11 is a block diagram of the control system inside the interchangeable lens unit pertaining to the first embodiment of the present invention.

FIG. 11 is a block diagram of the control system inside the interchangeable lens unit 2 pertaining to the first embodiment of the present invention.

The lens microprocessor 20 can perform bidirectional communication between the lens microprocessor 20 and a zoom controller 62, bidirectional communication between the lens microprocessor 20 and the focus controller 26, and bidirectional communication between the lens microprocessor 20 and the aperture controller 27.

The zoom controller 62 can receive signals from a zoom linear sensor 600 via an A/D converter 601. The zoom controller 62 converts the amount of rotation of the zoom ring 38 detected by the zoom linear sensor 600 into focal distance information about the imaging optical system L. The zoom controller 62 sends focal distance information to the lens microprocessor 20.

The focus controller 26 can receive signals from a focus linear sensor 63, and can send signals to a focus drive motor 65 via an A/D converter 64. The focus controller 26 determines the focus mode from the rotational angle of the focus ring 39, which is detected by the focus linear sensor 63 and digitized by the A/D converter 64. The focus controller 26 sends the result of this determination to the lens microprocessor 20. The focus controller 26 sends focal distance information detected from the rotational angle of the focus ring 39 to the lens microprocessor 20 on the basis of a command from the lens microprocessor 20. The focus controller 26 drives the focus drive motor 65 on the basis of a control signal from the lens microprocessor 20.

The aperture controller 27 can receive signals from the aperture linear sensor 41 and can send signals to the diaphragm drive motor 28b via the A/D converter 67. The aperture controller 27 determines the aperture mode from the rotational angle of the aperture ring 40, which is detected by the aperture linear sensor 41 and digitized by the A/D converter 67. The aperture controller 27 sends the result of this determination to the lens microprocessor 20. The aperture controller 27 sends aperture value information detected from the rotational angle of the aperture ring 40 to the lens microprocessor 20 on the basis of a command from the lens microprocessor 20. The aperture controller 27 drives the diaphragm drive motor 28b on the basis of a control signal from the lens microprocessor 20.

2: Operation of Camera System 2.1: Photographic Operation of Camera System 100 (Viewfinder Photography Mode)

Next, the photographic operation of the camera system 100 will be described. First, the drive sequence in viewfinder photography mode, in which the user looks through the viewfinder eyepiece window 9, will be described through reference to FIGS. 1, 2, 10, and 11.

When the user presses the release button 30 halfway down, power is supplied to the body microprocessor 12 and the various units in the camera system 100. The body microprocessor 12 in the camera system 100, which is activated by the supply of power, receives various kinds of lens data from the lens microprocessor 20 in the interchangeable lens unit 2, which is also activated by the supply of power, via the lens mount 21 and the body mount 23 and stores this data in the built-in memory 68. Then, the body microprocessor 12 acquires the amount of defocus (hereinafter referred to as the Df amount) from the focus detection unit 5 and instructs the lens microprocessor 20 to drive the focus lens group 25 by this Df amount. The lens microprocessor 20 controls the focus controller 26 so as to operate the focus lens group 25 by the Df amount. While this focus detection and drive of the focus lens group 25 are repeated, the Df amount decreases, and at the point when the amount drops to or below a specific level, the body microprocessor 12 determines that focus has been achieved and halts the drive of the focus lens group 25.

After this, when the user presses the release button 30 all the way down, the body microprocessor 12 instructs the lens microprocessor 20 to adjust the aperture value to what has been calculated on the basis of the output from a light sensor (not shown). The lens microprocessor 20 controls the aperture controller 27, and the aperture is stopped-down to the designated aperture value. Simultaneously with the designation of the aperture value, the body microprocessor 12 uses the quick return mirror controller 60 to retract the quick return mirror 4 from within the optical path X. Upon completion of this retraction, the imaging sensor controller 13 instructs that the imaging sensor 11 be driven and instructs that the shutter unit 10 be operated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11, and after undergoing specific image processing, this image data is displayed as a photographic image on the liquid crystal monitor 16. Also, image data that has been read from the imaging sensor 11 and has undergone specific image processing is written as image data to a storage medium via the image recorder 18. Also, upon completion of the exposure, the quick return mirror 4 and the shutter unit 10 are reset to their initial positions. The body microprocessor 12 instructs the lens microprocessor 20 to reset the aperture to its open position, and the lens microprocessor 20 issues reset commands to the various units. Upon completion of this resetting, the lens microprocessor 20 notifies the body microprocessor 12 of the completion of resetting. The body microprocessor 12 waits for the completion of a series of processing after exposure and the reset completion information from the lens microprocessor 20 and then confirms that the release button has not been pressed, which concludes the imaging sequence.

2.2: Operation in Monitor Photography Mode

Next, the drive sequence in monitor photography mode, in which the user captures an image using the liquid crystal monitor 16, will be described through reference to FIGS. 1, 3, 10, and 11.

When the liquid crystal monitor 16 is used to capture an image, the user presses the photography mode switching button 75 to set the camera to monitor photography mode. When the camera is set to monitor photography mode, the body microprocessor 12 retracts the quick return mirror 4 from within the optical path X. As a result, light from the subject reaches the imaging sensor 11, so the imaging sensor 11 converts the light from the subject imaged on the imaging sensor 11 into image data, allowing it to be acquired and outputted as image data. The image data read from the imaging sensor 11 by the imaging sensor controller 13 is subjected to specific image processing, after which it is displayed as a photographic image on the liquid crystal monitor 16. Thus displaying the photographic image on the liquid crystal monitor 16 allows the user to follow the subject without looking through the viewfinder eyepiece window 9.

Next, the user presses the release button 30 halfway down, whereupon the body microprocessor 12 receives various kinds of lens data from the lens microprocessor 20 in the interchangeable lens unit 2 via the lens mount 21 and the body mount 23. This lens data is stored in the built-in memory 68. Then, the body microprocessor 12 uses the quick return mirror controller 60 to return the quick return mirror 4 to a specific position within the optical path X, acquires the Df amount from the focus detection unit 5 and instructs the lens microprocessor 20 to drive the focus lens group 25 by this Df amount. The lens microprocessor 20 controls the focus controller 26 so as to operate the focus lens group 25 by the Df amount. While this focus detection and drive of the focus lens group 25 are repeated, the Df amount decreases, and at the point when the amount drops to or below a specific level, the body microprocessor 12 determines that focus has been achieved and halts the drive of the focus lens group 25.

After this, when the user presses the release button 30 all the way down, the body microprocessor 12 instructs the lens microprocessor 20 to adjust the aperture value to what has been calculated on the basis of the output from a light sensor (not shown). The lens microprocessor 20 controls the aperture controller 27, and the aperture is stopped-down to the designated aperture value. Simultaneously with the designation of the aperture value, the body microprocessor 12 uses the quick return mirror controller 60 to retract the quick return mirror 4 from within the optical path X. Upon completion of this retraction, the imaging sensor controller 13 instructs that the imaging sensor 11 be driven and instructs that the shutter unit 10 be operated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11, and after undergoing specific image processing, this image data is displayed as a photographic image on the liquid crystal monitor 16. Also, image data that has been read from the imaging sensor 11 and has undergone specific image processing is written as image data to a storage medium via the image recorder 18. Also, upon completion of the exposure, the quick return mirror 4 and the shutter unit 10 are positioned in a state of being retracted from within the optical path X, so the user can then use the monitor photography mode to view the subject as a photographic image on the liquid crystal monitor 16.

When the monitor photography mode is to be canceled, the user presses the photography mode switching button 75 and changes back to the ordinary photography mode. That is, the viewfinder photography mode in which the user looks through the viewfinder eyepiece window 9 to capture an image. When the camera is changed back to viewfinder photography mode, the quick return mirror 4 is returned to a specific position within the optical path X. The quick return mirror 4 is also returned to a specific position within the optical path X when the power is shut off to the camera system 100 (such as a single-lens reflex digital camera) main body.

2.3: Exposure Setting Operation for Camera System

Next, the operation of setting the exposure for the camera system 100 will be described through reference to FIGS. 4 and 10. The camera system 100 has four exposure setting modes: a programmed photography mode in which the exposure setting is performed automatically for an ordinary photographic region; a shutter speed preferential photography mode in which the shutter speed is set manually; an aperture preferential photography mode in which the aperture value is set manually; and a manual photography mode in which the shutter speed and aperture value are both set manually.

The user operating the camera system 100 can select among the four exposure setting modes by setting a combination of a specific rotational angle of the aperture ring 40 and the rotational angle of the shutter speed setting dial 31. Specifically, in a state in which the letter "A" on the aperture ring 40 lines up with the pointer 33, the user can set the camera to the programmed photography mode by putting the shutter speed setting dial 31 in the auto position. In a state in which the letter "A" on the aperture ring 40 lines up with the pointer 33, the user can set the camera to the shutter speed preferential photography mode by putting the shutter speed setting dial 31 in the manually settable position. In a state in which any of the numbers "2" to "11" on the aperture ring 40 lines up with the pointer 33, the user can set the camera to the aperture preferential photography mode by putting the shutter speed setting dial 31 in the auto position. In a state in which any of the numbers "2" to "11" on the aperture ring 40 lines up with the pointer 33, the user can set the camera to the manual photography mode by putting the shutter speed setting dial 31 in the manual position.

From here on, of these four exposure setting modes, the programmed photography mode and the shutter speed preferential photography mode will be collectively referred to as the auto aperture mode. The aperture preferential photography mode and manual photography mode will be collectively referred to as the manual aperture mode.

2.4: Exposure Setting Operation in Auto Aperture Mode

The aperture linear sensor 41 outputs a signal corresponding to rotational angle to the aperture controller 27. When the letter "A" on the aperture ring 40 lines up with the pointer 33, and the user presses the release button 30, the aperture controller 27 determines that the exposure setting mode is the auto aperture mode on the basis of the signal received from the aperture linear sensor 41. The result of this determination is sent to the lens microprocessor 20 and the body microprocessor 12 (sending to the body microprocessor 12 is carried out via microprocessor communication between the lens microprocessor 20 and the body microprocessor 12).

Also, the shutter speed setting dial 31 outputs a signal corresponding to rotational angle to the body microprocessor 12. The body microprocessor 12 recognizes that the exposure setting mode is the auto aperture mode on the basis of the determination result received from the aperture controller 27 and the signal from the shutter speed setting dial 31.

The body microprocessor 12 sends a command to the digital signal processor 53. The digital signal processor 53 sends the body microprocessor 12 an image signal at a specific timing on the basis of the received command. The body microprocessor 12 computes an exposure value on the basis of the received image signal. If the exposure setting mode is the programmed photography mode, the body microprocessor 12 computes a suitable combination from the adjustable aperture value and shutter speed. If the exposure setting mode is the shutter speed preferential photography mode, the body microprocessor 12 computes a suitable aperture value for the set shutter speed.

The body microprocessor 12 produces a control signal on the basis of the computation result. The body microprocessor 12 sends a control signal based on the computed aperture value to the aperture controller 27 via the lens microprocessor 20 on the interchangeable lens unit 2 side. If the exposure setting mode is the programmed photography mode, the body microprocessor 12 sends a control signal based on the computed shutter speed to the shutter controller 14. If the exposure setting mode is the shutter speed preferential photography mode, the body microprocessor 12 sends the shutter controller 14 information about the shutter speed set by the shutter speed setting dial 31.

Also, the body microprocessor 12 sends a control signal to the image display controller 15. The image display controller 15 drives the liquid crystal monitor 16. When the content of the control signal designates the programmed photography mode, the liquid crystal monitor 16 indicates that the exposure setting mode is the programmed photography mode. When the content of the control signal designates the shutter speed preferential photography mode, the liquid crystal monitor 16 indicates that the exposure setting mode is the shutter speed preferential photography mode.

The aperture controller 27 produces a drive signal for driving the diaphragm drive motor 28b on the basis of a control signal from the lens microprocessor 20. The diaphragm drive motor 28b is driven on the basis of this drive signal. The drive of the diaphragm drive motor 28b results in the aperture blades being driven.

The shutter controller 14 produces a drive signal for driving the shutter drive motor 10a on the basis of a control signal from the body microprocessor 12. The shutter drive motor 10a is driven on the basis of this drive signal. The drive of the shutter drive motor 10a results in the shutter unit 10 being driven.

Exposure setting in the auto aperture mode of the camera system 100 is performed as discussed above. The above operation is executed instantly after the operation of the release button 30 by the user.

When imaging is complete, the body microprocessor 12 sends a control signal to the image recording controller 17. The image recorder 18 records an image signal to an internal memory and/or removable memory on the basis of a command from the image recording controller 17.

When the content of the control signal designates the programmed photography mode, the image recorder 18 records an image signal and information to an internal memory and/or removable memory on the basis of a command from the image recording controller 17 indicating that the exposure setting mode is the programmed photography mode. When the content of the control signal designates the shutter speed preferential photography mode, the image recorder 18 records an image signal and information to an internal memory and/or removable memory on the basis of a command from the image recording controller 17 indicating that the exposure setting mode is the shutter speed preferential photography mode.

2.5: Exposure Setting Operation in Manual Aperture Mode

Next, when the position of any of the numbers "2" to "11" on the aperture ring 40 lines up with the pointer 33 and the user presses the release button 30, the aperture controller 27 determines that the exposure setting mode is the manual aperture mode on the basis of the signal received from the aperture linear sensor 41. The result of this determination is sent to the lens microprocessor 20. Also, the shutter speed setting dial 31 outputs a signal corresponding to rotational angle to the body microprocessor 12.

The body microprocessor 12 recognizes that the exposure setting mode is the manual aperture mode on the basis of the determination result received from the aperture controller 27 and the signal from the shutter speed setting dial 31.

The lens microprocessor 20 requests the aperture controller 27 to provide aperture value information detected from the rotational angle of the aperture ring 40. The aperture controller 27 sends the aperture value information detected from the rotational angle of the aperture ring 40 on the basis of a command from the lens microprocessor 20 to the lens microprocessor 20 and the body microprocessor 12 (sending to the body microprocessor 12 is carried out via microprocessor communication between the lens microprocessor 20 and the body microprocessor 12). If the exposure setting mode is the aperture preferential photography mode, the body microprocessor 12 sends a command to the digital signal processor 53. The digital signal processor 53 sends an image signal to the body microprocessor 12 at a specific timing on the basis of the received command.

If the exposure setting mode is the aperture preferential photography mode, the body microprocessor 12 computes the shutter speed on the basis of the received image signal. If the exposure setting mode is the aperture preferential photography mode, the body microprocessor 12 computes a suitable shutter speed for the detected aperture value. If the exposure setting mode is the aperture preferential photography mode, the body microprocessor 12 produces a control signal on the basis of the computation result. If the exposure setting mode is the aperture preferential photography mode, the body microprocessor 12 sends a control signal based on the computed shutter speed to the shutter controller 14. If the exposure setting mode is the manual photography mode, the body microprocessor 12 sends information about the shutter speed set by the shutter speed setting dial 31 to the shutter controller 14.

Also, the body microprocessor 12 sends a control signal to the image display controller 15. The image display controller 15 drives the liquid crystal monitor 16. When the content of the control signal designates the aperture preferential photography mode, the liquid crystal monitor 16 indicates that the exposure setting mode is the aperture preferential photography mode. When the content of the control signal designates the manual photography mode, the liquid crystal monitor 16 indicates that the exposure setting mode is the manual photography mode.

The aperture controller 27 produces a drive signal for driving the diaphragm drive motor 28b on the basis of a control signal from the lens microprocessor 20. The diaphragm drive motor 28b is driven on the basis of this drive signal. The drive of the diaphragm drive motor 28b results in the aperture blades being driven. The shutter controller 14 produces a drive signal for driving the shutter drive motor 10a on the basis of a control signal from the body microprocessor 12. The shutter drive motor 10a is driven on the basis of this drive signal. The drive of the shutter drive motor 10a results in the shutter unit 10 being driven.

Exposure setting in the manual aperture mode of the camera system 100 is performed as discussed above. The above operation is executed instantly after the operation of the release button 30 by the user.

When imaging is complete, the body microprocessor 12 sends a control signal to the image recording controller 17. The image recorder 18 records an image signal to an internal memory and/or removable memory on the basis of a command from the image recording controller 17.

When the content of the control signal designates the aperture preferential mode, the image recorder 18 records an image signal and information to an internal memory and/or removable memory on the basis of a command from the image recording controller 17 indicating that the exposure setting mode is the aperture preferential mode. When the content of the control signal designates the manual photography mode, the image recorder 18 records an image signal and information to an internal memory and/or removable memory on the basis of a command from the image recording controller 17 indicating that the exposure setting mode is the manual photography mode.

2.6: Operation in Depth of Field Reviewing Mode

Figure 12:
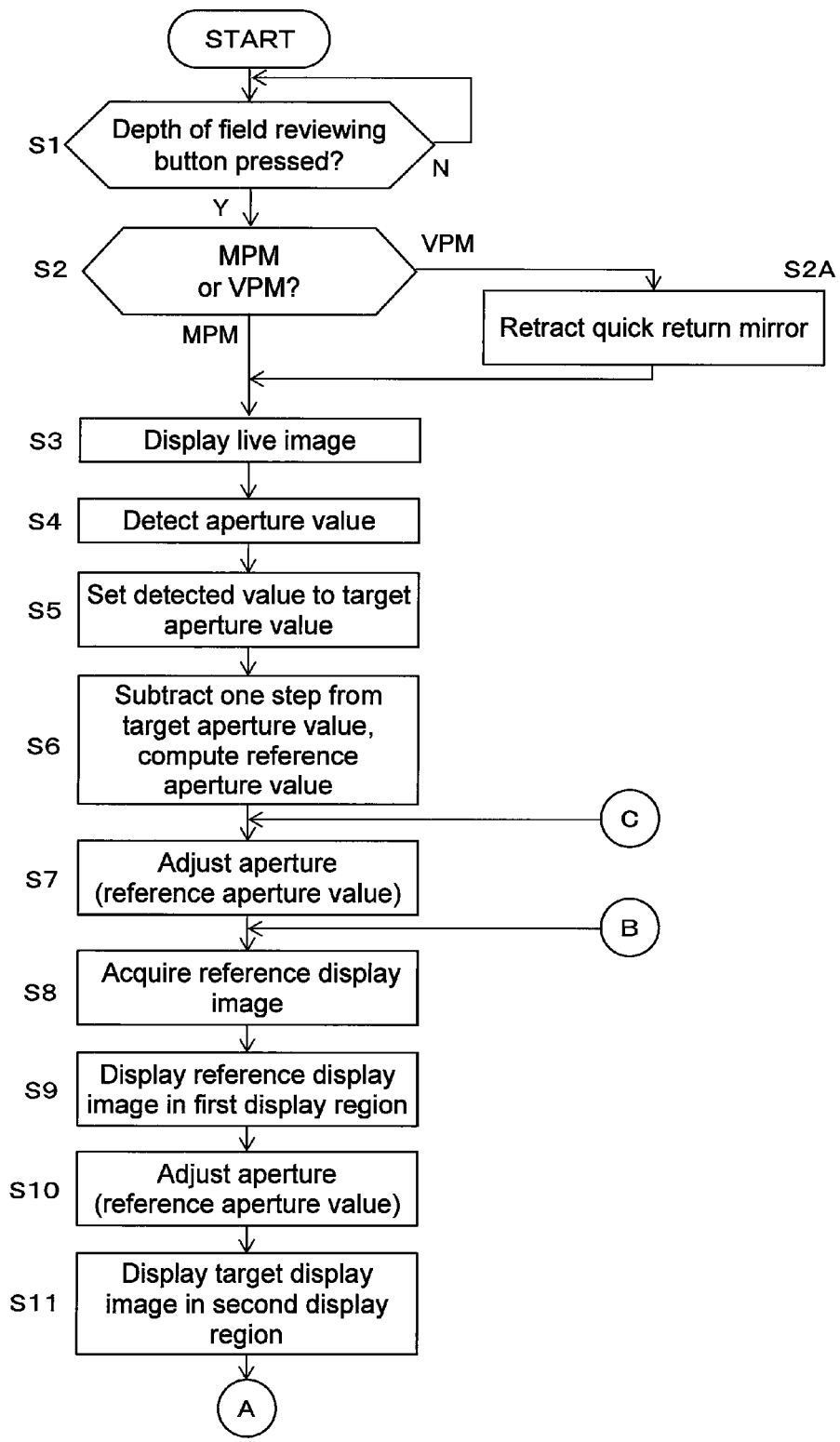
FIG. 12 is a flowchart of a depth of field reviewing mode.
Figure 13:
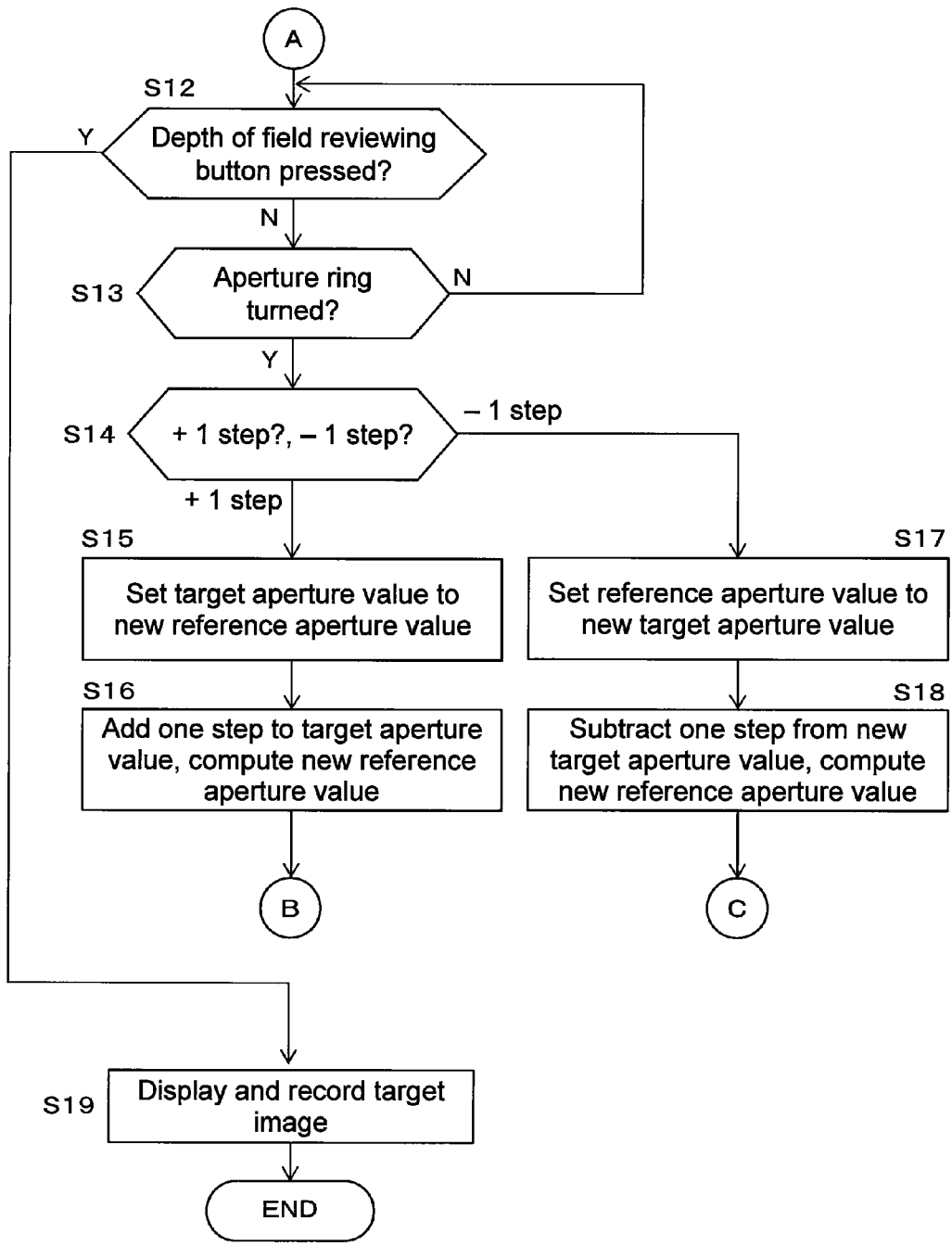
FIG. 13 is a flowchart of a depth of field reviewing mode.
Figure 14:
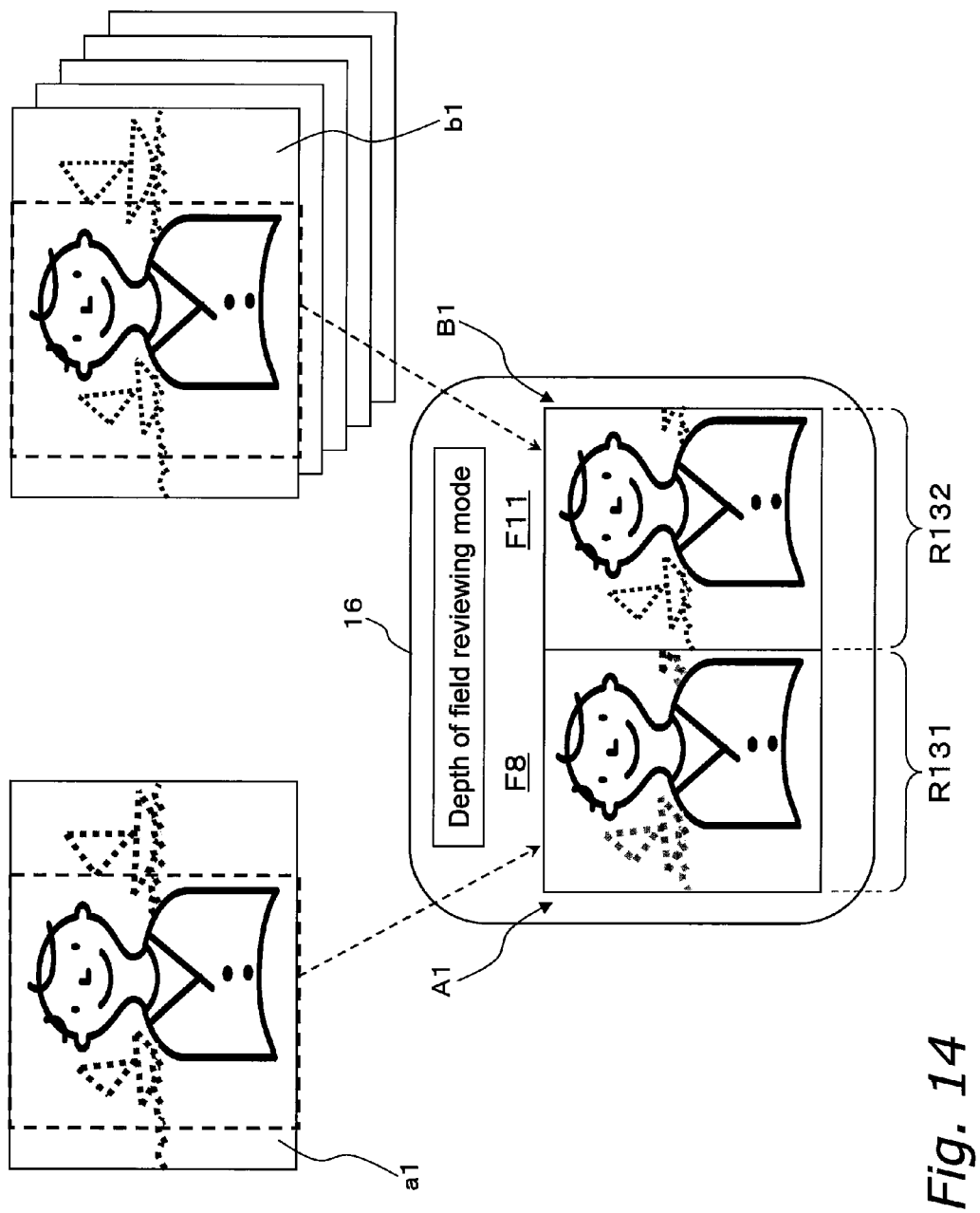
FIG. 14 is an example of the display on a liquid crystal monitor.
Figure 15:
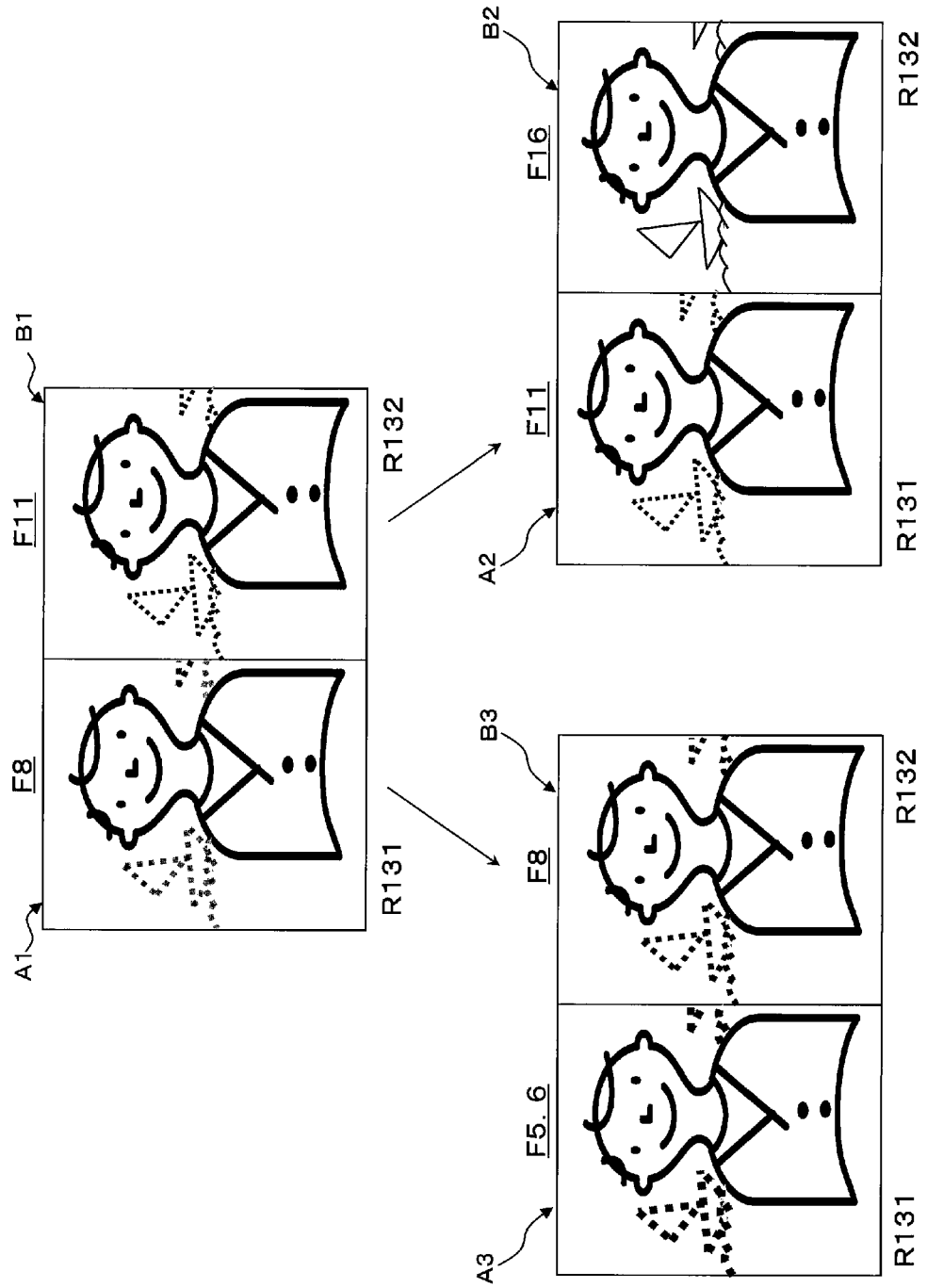
FIG. 15 is an example of the display on a liquid crystal monitor.

With this camera system 100, a depth of field reviewing mode is further provided so that a plurality of images with different aperture values can be compared side by side. The specific operation in depth of field reviewing mode will be described through reference to FIGS. 12 to 14. FIGS. 12 and 13 are flowcharts of the depth of field reviewing mode. FIGS. 14 and 15 are an example of how images are displayed on the liquid crystal monitor 16 in the depth of field reviewing mode.

In this depth of field reviewing mode, a target image to be captured and a reference image that is related to the target image are displayed side by side on the left and right of the liquid crystal monitor 16. The target image and reference image are images acquired under different photography conditions, but the photography condition for the reference image (first photography condition) is determined on the basis of the photography condition for the target image (second photography condition).

More specifically, as shown in FIG. 12, the body microprocessor 12 of the camera system 100 determines whether the depth of field reviewing button 76 (FIG. 5) has been pressed (step S1). If the depth of field reviewing button 76 has been pressed, the mode changes to depth of field reviewing mode. More specifically, the body microprocessor 12 determines whether the photography mode is the monitor photography mode or the viewfinder photography mode (step S2). If the photography mode is the monitor photography mode, a live image of the subject is displayed on the liquid crystal monitor 16. On the other hand, if the photography mode is the viewfinder photography mode, the quick return mirror 4 is retracted from the optical path X (step S2A) and a live image of the subject is displayed on the liquid crystal monitor 16 (step S3). At this point, the aperture controller 27 detects the aperture value (such as F11) currently set by the aperture ring 40, for example (step S4). The detected aperture value is sent as a target aperture value (second photography condition) from the lens microprocessor 20 to the body microprocessor 12 and is stored in the memory 68 of the body microprocessor 12. As a result, the aperture value F11 is set as the target aperture value (step S5).

The reference aperture value (first photography condition) is set on the basis of the target aperture value. More specifically, the aperture value F8 obtained by subtracting one step (a specific width) from the target aperture value F11 is set by the body microprocessor 12 as the reference aperture value (step S6). For example, when one step is subtracted from the aperture value, the amount of light that passes through the aperture is doubled, and when one step is added to the aperture value, the amount of light that passes through the aperture is halved. The aperture value obtained by subtracting one step from the target aperture value is set as the reference aperture value, but the reference aperture value is an aperture value obtained by adding one step.

When the setting of the target aperture value and the reference aperture value is complete, the aperture is adjusted by the aperture setting component 29 so that the actual aperture value will be the reference aperture value F8 and the reference image a1 (first image) is acquired by the imaging component 45 (steps S7 and S8). As shown in FIG. 14, part of the reference image a1 is displayed in the first display region R131 as the reference display image A1 (first display image) (step S9). The reference display image A1 is a single still image. At this point, the reference aperture value F8 is displayed above the reference display image A1. The range of the reference display image A1 in the reference image a1 is preset by the body microprocessor 12, for example.

Next, the aperture is adjusted by the aperture setting component 29 so that the actual aperture value will be the target aperture value, and a plurality of target images b1 (second images) are successively acquired by the imaging component 45 in a specific period (steps S10 and S11). As shown in FIG. 14, part of the target image b1 is displayed in the second display region R132 as a target display image B1 (second display image) (step S12). The target display image B1 is a real-time image (live image) of the subject. The target aperture value F11 is displayed above the target display image B1. The range of the target display image B1 in the target image b1 is preset by the body microprocessor 12, for example.

Here, since the target display image B1 has an aperture value that is the target aperture value F11, both the background and the person in the middle are more or less in better focus than in the reference display image A1 and the subject field is relatively deep. On the other hand, since the aperture value of the reference display image A1 is the preset value F8, the person in the middle is in better focus than in the target display image B1, but the background is out of focus and the subject field is relatively shallow.

Thus, the indicated value on the aperture ring 40 is utilized to acquire the target display image B1 and the reference display image A1 automatically. Accordingly, the user can compare the target display image B1 with the reference display image A1, which have adjacent aperture values and two images with related photography conditions can be easily compared.

Next, as shown in FIG. 13, it is determined whether or not the depth of field reviewing button 76 has been pressed (step S12). More specifically, if the user decides that the target aperture value F11 of a comparative image B will be the final photography condition, then the depth of field reviewing button 76 is pressed by the user. As shown in FIG. 13, when the depth of field reviewing button 76 is pressed, an image is acquired by the imaging component 45 at an aperture value of F11. This image is displayed as the final image C on the liquid crystal monitor 16, and is stored in the image recorder 18 (step S19). Once the final image C has been stored, the depth of field reviewing mode is concluded.

Meanwhile, if the depth of field reviewing button 76 has not been pressed, it is determined by the aperture controller 27 whether or not the aperture ring 40 has been operated (step S13). If the aperture ring 40 has not been operated, the system awaits input from the depth of field reviewing button 76 and the aperture ring 40.

If the aperture ring 40 has been operated, the aperture controller 27 determines whether or not the indicated value is an increase or decrease of one step (step S14). For instance, if the indicated value on the aperture ring 40 is changed from F11 to F16, the aperture value increases one step, so the target aperture value F11 is set by the body microprocessor 12 as a new reference aperture value (step S15). F16, which is obtained by adding one step of the reference aperture value F11, is set by the body microprocessor 12 as a new target aperture value (step S16). Once the setting of the reference aperture value is complete, a new image is acquired, and as shown in the lower right of FIG. 15, a new reference display image A2 is displayed in the first display region R131 (steps S8 and S9). At this point, the reference display image A2 is acquired in a state in which the aperture value at the aperture setting component 29 is F11.

Upon completion of the display of the reference display image A2, the aperture is adjusted by the aperture setting component 29 so that the actual aperture value will be the target aperture value F16, and a moving image of the subject is displayed as the target display image B2 in the second display region R132 (steps S10 and S11) as shown in the lower right of FIG. 15.

Meanwhile, if the indicated value on the aperture ring 40 is changed from F11 to F8, the aperture value is reduced by one step, so the reference aperture value F8 is set as a new reference aperture value by the body microprocessor 12 (steps S14 and S17). Further, F5.6, which is obtained by subtracting one step from the new reference aperture value F8, is set as a new reference aperture value by the body microprocessor 12 (step S18). When the setting of the reference aperture value is complete, the aperture is adjusted by the aperture setting component 29 so that the aperture value will be a reference aperture value of F5.6, thereby acquiring a new reference display image A3 (step S7). Upon completion of the aperture adjustment, the new reference display image A3 is acquired, and as shown in the lower right of FIG. 15, the new reference display image A3 is displayed in the first display region R131 (steps S8 and S9).

Upon completion of the display of the reference display image A3, the aperture is adjusted by the aperture setting component 29 so that the actual aperture value is the reference aperture value F8, and as shown in the lower right of FIG. 15, a moving image of the subject is displayed as the target display image B2 in the second display region R132 (steps S10 and S11). Thereafter, these steps are repeated until the depth of field reviewing button 76 is pressed.

Thus, with the camera system 100, two images captured at adjacent aperture values can be displayed side by side. Therefore, it is easier, for example, for the user to confirm a change in the image accompanying a change in photography conditions, making it easier to find the desired photography conditions. This affords better correlation between images and improves convenience in the comparison of images.

Other Embodiments

The specific constitution of the present invention is not limited to the embodiment given above, and various modifications and revisions are possible without departing from the gist of the invention.

(1)

In the above embodiment, the target display image was a moving image, and the reference display image was a still image. However, it is also possible that the reference display image and reference display image will both be moving images. In this case, for example, the aperture is adjusted by the aperture setting component 29 so that the aperture value alternately becomes the target aperture value and the reference aperture value, and as the aperture adjustment operation proceeds, target aperture values and reference aperture values are alternately acquired. As a result, the reference display image acquired under a photography condition related to the target aperture value is displayed as a moving image side by side with the target display image that is to be captured. As a result, even if the user changes the framing or if the subject moves, it will still be possible to compare the two images with substantially the same composition. Consequently, convenience is further improved in comparing images side by side.

A case in which the target aperture value and the reference aperture value are both still images is also conceivable.

Furthermore, a case in which two images with adjacent photography conditions are displayed side by side in confirming by reproduction mode a series of image groups captured continuously under different photography conditions is also conceivable.

(2)

With the above embodiment, the photography condition was the aperture value, but the photography condition is not limited to being the aperture value. For instance, the photography condition may be the shutter speed, exposure value, photography mode, etc.

Also, in the above embodiment, the specific width was one step of the aperture value, but the specific width may instead be set to two steps. Also, when the photography condition is the exposure value, for example, the specific width can be ½EV, ⅓EV, etc. Also, a constitution in which the specific width can be set by the user is conceivable.

(3)

With the above embodiment, the first reference aperture value when the mode changed to the depth of field reviewing mode was set to the indicated value on the aperture ring 40, but the first target aperture value may be set ahead of time by the body microprocessor 12 or the like, for example. For example, a case in which the first target aperture value is automatically set to one aperture value from among the smallest aperture value (such as F1), a median value (such as F8), or the largest aperture value (such as F22) is conceivable. Also, a constitution in which the specific width can be set by the user is conceivable.

Also, in the above embodiment, in determining the reference aperture value from the first target aperture value, one step was subtracted from the aperture value to calculate the reference aperture value, but a case in which one step is added to the target aperture value to calculate the reference aperture value is also conceivable.

(4)

With the above embodiment, the aperture ring 40 mounted on the interchangeable lens unit 2 was used to change the photography condition, but the configuration may be such that instead of the aperture ring 40, a dial, button, or other such control mounted on the camera main body 1 is used to change the aperture value. Also, the control mounted on the camera main body 1 need not be a control [just] for changing the aperture value, and may be a control that is also be used for another purpose. For instance, the configuration may be such that the aperture value can be changed one step at a time by using a directional arrow key 73.

(5)

With the above embodiment, the target display image was displayed in the second display region R132 on the right, and the reference display image was displayed in the first display region R131 on the left, but the configuration may instead be such that the target display image is displayed in the first display region R131, and the reference display image in the second display region R132. Also, the layout of the first display region R131 and second display region R132 is not limited to that in the above embodiment. For example, the first display region R131 and second display region R132 may be disposed one above the other.

(6)

Figure 16:
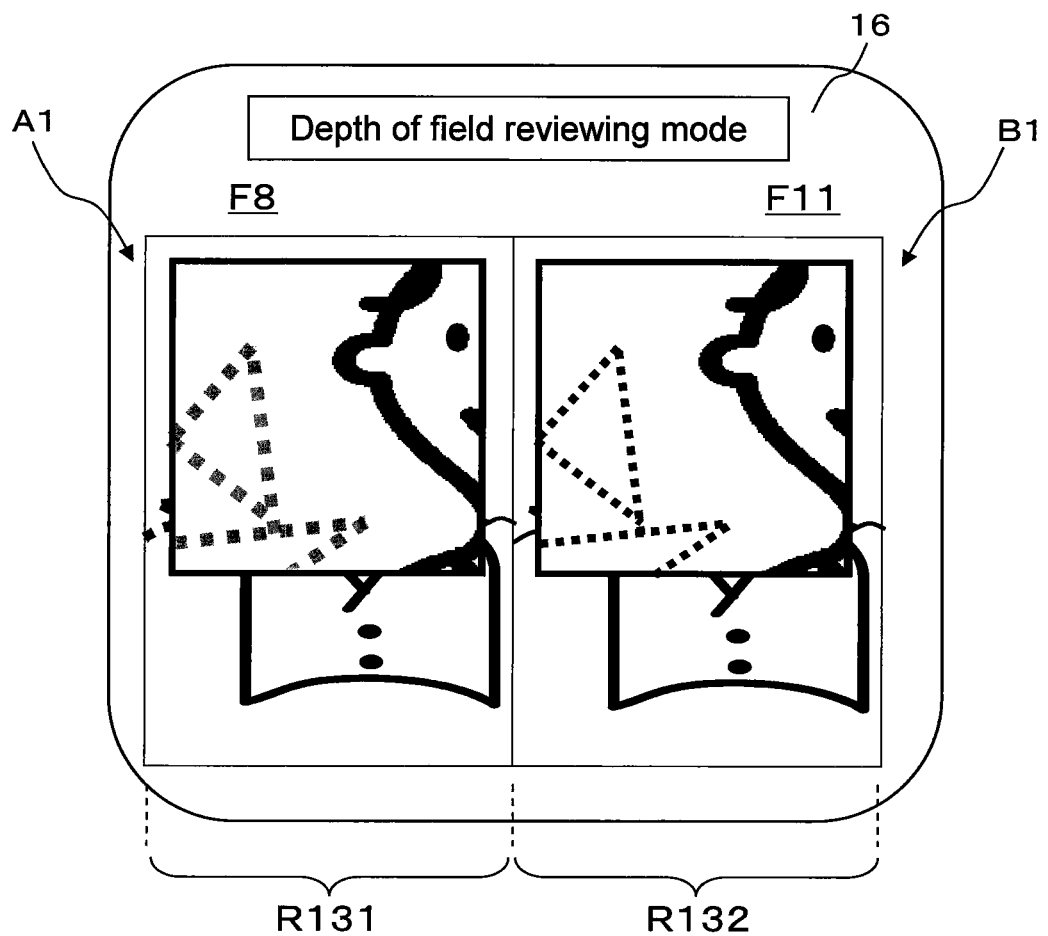
FIG. 16 is an example of the display on a liquid crystal monitor (other embodiment)

The method for displaying the reference display image An and the target display image Bn is not limited to that given in the above embodiment. For instance, as shown in FIG. 16, if part of the reference display image An and part of the comparative display image Bn are enlarged for display, it will be easier to compare detail portions of the reference display image An and the comparative display image Bn. This makes it easier for the user to confirm a change in the aperture value. Also, the original image and enlarged image may be updated at the same time, or an enlarged image may be displayed superimposed over the original image.

Figure 17:
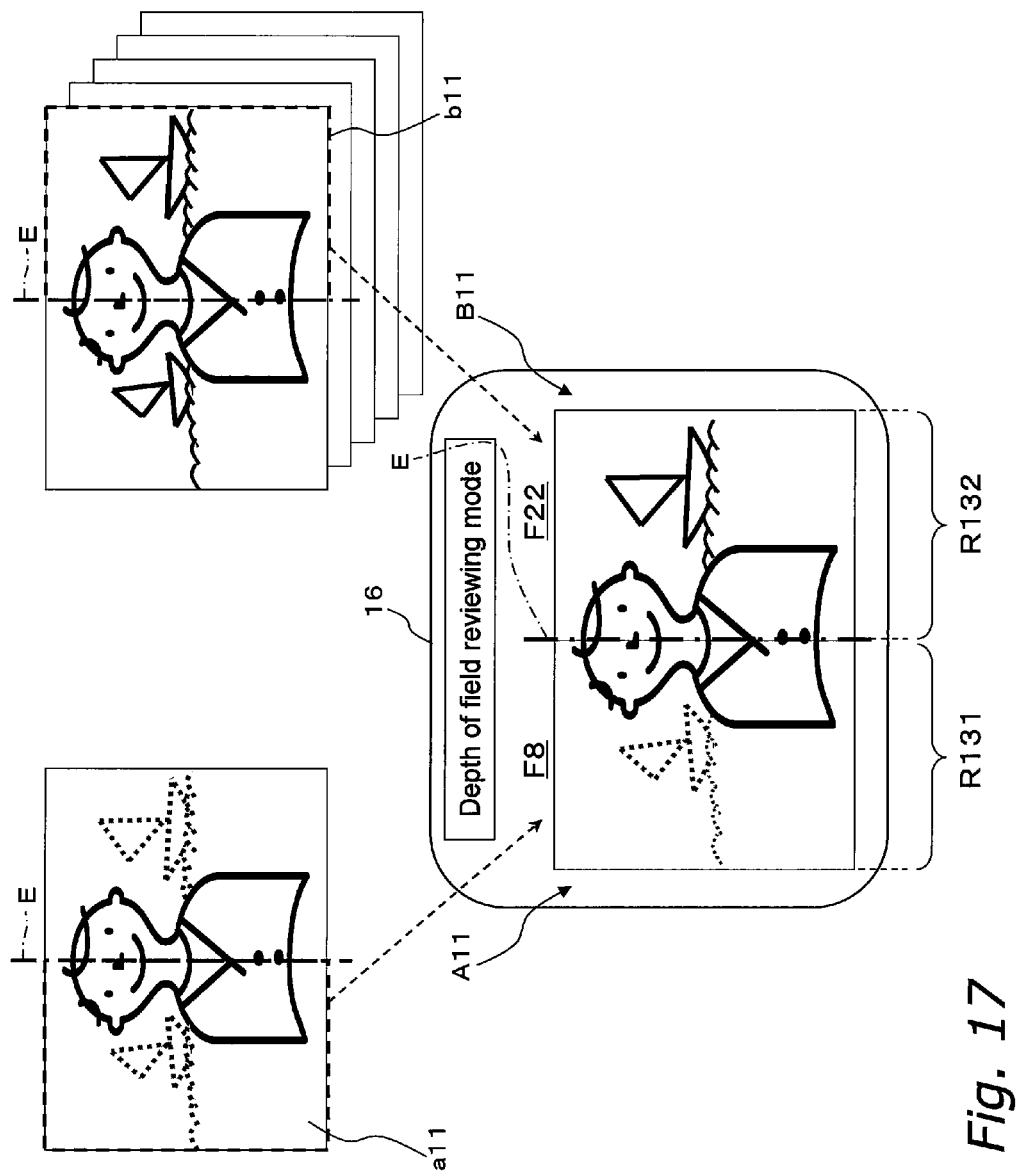
FIG. 17 is an example of the display on a liquid crystal monitor (other embodiment).

Also, in the above embodiment, the positional relationship of the reference display image A1 with respect to the reference image a1 was the same as the positional relationship of the target display image B1 with respect to the target image b1. However, as shown in FIG. 17, the reference display image A11 may be the left half of the reference image a11, and the target display image B11 may be the right half of the target image b11. Specifically, the reference display image An and target display image Bn are in a relationship of linear symmetry based on the center line E of the image acquired by the imaging component 45. In this case, if the reference display image A11 is displayed in the first display region R131 and the target display image B11 in the second display region R132, as long as the composition of the subject does not change greatly, it will be possible for the reference display image A11 and the target display image B11 to be displayed as a single image. This further increases convenience in comparing images.

(7)

In the above embodiment, the image displayed on the liquid crystal monitor 16 was acquired by the imaging sensor 11, but it is also possible to use a separate imaging sensor disposed in the viewfinder optical system. In this case, there is no need to retract the quick return mirror 4 from the optical path X in monitor photography mode. Also, the configuration and disposition of the quick return mirror 4, the viewfinder optical system 19, and other devices in the camera system are not limited to those discussed above.

(8)

In the above embodiment, when the depth of field reviewing button 76 was pressed once, the mode changed to depth of field reviewing mode, and this depth of field reviewing mode was cancelled when the depth of field reviewing button 76 was pressed again. However, the configuration may be such that the depth of field reviewing mode continues only so long as the depth of field reviewing button 76 is being pressed.

(9)

In the above embodiment, a single-lens reflex camera was used as an example of the camera system 100, but embodiments of the camera system 100 are not limited to this. For example, this camera system 100 can also be applied to a compact camera or the like.

(10)

The coordinate axes and directions used in the above description do not limit the usage state of the present invention.

General Interpretation of Terms

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A camera system, comprising:
    an imaging optical system configured to form an optical image of a subject;
    an imaging component configured to convert the optical image into an image signal and acquiring an image of the subject based on a photography condition;
    a display component having first and second display regions that allow a plurality of images acquired by the imaging component to be displayed side by side;
    a condition setting component with which a first photography condition, a second photography condition and a third photography condition can be set as a setting condition, one of the first and second photography conditions is determined on the basis of the other, the third photography condition being determined on the basis of either the first or the second photography condition;
    a condition adjustment component configured to adjust the photography condition on the basis of the set condition; and
    a display control component configured to control the display component to display as a first display image which is a single still image at least part of a first image acquired by the imaging component under the first photography condition in the first display region, the display control component configured to control the display component to display as a second display image which is a moving image at least part of a second image acquired by the imaging component under the second photography condition in the second display region.

2. The camera system according to claim 1, wherein the condition setting component changes one of the first or second photography condition then determines the setting condition of the other by a specific width.

3. The camera system according to claim 2, further comprising
    a condition input component with which either the first or the second photography condition can be inputted.

4. The camera system according to claim 1, further comprising
    a condition input component with which either the first or the second photography condition can be inputted.

5. A camera system, comprising:
an imaging optical system configured to form an optical image of a subject;
an imaging component configured to convert the optical image into an image signal and acquiring an image of the subject based on a photography condition;
a display component having first and second display regions that allow a plurality of images acquired by the imaging component to be displayed side by side;
a condition setting component with which a first photography condition, a second photography condition and a third photography condition can be set as a setting condition, one of the first and second photography conditions is determined on the basis of the other, the third photography condition being determined on the basis of either the first or the second photography condition;
a condition adjustment component configured to adjust the photography condition on the basis of the set condition; and
a display control component configured to control the display component to display as a first display image which is a single still image or a moving image at least part of a first image acquired by the imaging component under the first photography condition in the first display region, the display control component configured to control the display component to display as a second display image which is a moving image at least part of a second image acquired by the imaging component under the second photography condition in the second display region, wherein the condition setting component is configured to change the first photography condition and the second photography condition; and
the display control component is configured to control the display component to display as the first display image which is a single still image or a moving image at least part of the second image acquired by the imaging component under the pre-change second photography condition when the post-change first photography condition is the same as the pre-change second photography condition.

6. The camera system according to claim 5, wherein the display control component is configured to control the display component to display as the first display image at least part of the second image acquired by the imaging component under the pre-change second photography condition in the first display region when the post-change first photography condition is the same as the pre-change second photography condition.

7. The camera system according to claim 5, wherein
the condition setting component changes one of the first or second photography condition then determines the setting condition of the other by a specific width.

8. The camera system according to claim 7, further comprising
a condition input component with which either the first or the second photography condition can be inputted.

9. The camera system according to claim 5, further comprising
a condition input component with which either the first or the second photography condition can be inputted.

* * * * *